United States Patent [19]

Jacobson et al.

[11] 3,824,334

[45] July 16, 1974

[54] DATA COMMUNICATIONS NETWORK

[75] Inventors: Charles L. Jacobson, Pittsford; John Tambert, Rochester; Stanley J. Zurakowski, Fairport, all of N.Y.

[73] Assignee: Xerox Corporation, Stamford, Conn.

[22] Filed: July 23, 1971

[21] Appl. No.: 165,527

[52] U.S. Cl. .................................. 178/6, 179/2 DP
[51] Int. Cl. ............................................ H04n 1/32
[58] Field of Search .......... 178/DIG. 23, DIG. 22, 6; 179/2 DP, 2 R, 2.5, 4

[56] References Cited

UNITED STATES PATENTS

| | | | |
|---|---|---|---|
| 2,843,660 | 7/1958 | Franklin et al. | 179/4 |
| 3,098,119 | 7/1963 | Lemelson | 178/DIG. 22 |
| 3,376,509 | 4/1968 | Willcox et al. | 179/2 DP |
| 3,549,809 | 12/1970 | Stehr | 179/2 DP |
| 3,592,962 | 7/1971 | Matthews et al. | 178/DIG. 23 |
| 3,597,544 | 8/1971 | Kennedy | 179/2 DP |

*Primary Examiner*—Howard W. Britton

[57] ABSTRACT

A method of establishing data communication between a data transmitting device and one or more data receiving devices and the apparatus therefor are provided in accordance with the teachings of the present invention. One of a predetermined number of data transmitting devices is selected to transmit data information. The capability of each of a predetermined number of data receiving devices to receive data information is determined and one or more of said predetermined number of data receiving devices is selected to receive data information. The data transmitting device selected to transmit data information is enabled to commence data information transmission and the data information received therefrom is transmitted to those data receiving devices selected to receive and capable of receiving data information. Indications of the selection of data transmitting and data receiving devices are provided as well as indications of the selection of data receiving devices not capable of receiving data information. The transmission of data information to a data receiving device that is not capable of receiving data information although said data receiving device has been inadvertently selected, is prevented.

33 Claims, 8 Drawing Figures

INVENTORS
Charles L. Jacobson
John Tambert
BY Stanley J. Zurakowski
Mann & Jangarathis
ATTORNEYS

PATENTED JUL 16 1974 3,824,334

INVENTORS
Charles L. Jacobson
John Tambert
Stanley J. Zurakowski
BY
Marn & Jangarathis
ATTORNEYS INVENTORS
Charles L. Jacobson
John Tambert
Stanley J. Zurakowski
BY Marn & Jangarathis
ATTORNEYS Fig. 7. Local Select Control INVENTORS
Charles L. Jacobson
John Tambert
BY Stanley J. Zurakowski
Marn & Jangarathis
ATTORNEYS

*INVENTORS*
Charles L. Jacobson
John Tambert
Stanley J. Zurakowski

BY Marn & Jangarathis

*ATTORNEYS*

DATA COMMUNICATIONS NETWORK

This invention relates to data communication networks and in particular, to a method of and apparatus for establishing communication between one of a predetermined number of data transmitting devices and one or more of a predetermined number of data receiving devices.

In the field of data communications it is often desirable that a single central station be capable of communicating with any one of a predetermined number of remote stations. For example, in conventional computer time sharing systems, a general purpose digital computer is readily utilized for two-way communication by individual subscribers thereto, which subscribers may be situated at distinct locations. In another example, telemetry data systems have been developed to enable a plurality of remote data sources to transmit data to a centralized data location. Unfortunately, data communication systems of the types just described do not readily permit the transmission of data from a central location simultaneously to a plurality of remote locations. Furthermore, these systems are usually not provided with the capability of providing data communication between remote locations. Also, the transmitting and receiving stations of prior art communication systems, such as the aforementioned telemetry data systems, are usually chosen in a predetermined manner and are not adapted to be randomly selected. In addition, the requisite communication paths extending between remote locations and a central station are notoriously expensive to construct and to maintain.

Conventional facsimile transmission systems heretofore utilized in the prior art suffer from disadvantages that are analogous to those described with respect to other data communication systems. Hence, although facsimile information may be expeditiously transmitted between two facsimile transceivers, it has heretofore been impractical to transmit facsimile information simultaneously to a plurality of facsimile transceivers. The manner in which business is transacted today requires the prompt transmission of data, and more particularly facsimile information, to a plurality of stations. Moreover, many organizations have numerous office locations that are geographically dispersed throughout the country and throughout the world. It is often desirable to rapidly transmit documents to a plurality of these offices from a central office and to receive documents therefrom. Furthermore, it is frequently necessary to enable an operator stationed at a central office to regulate the transmission of documents between remote offices.

In an attempt to accomplish the foregoing, the prior art has developed facsimile broadcasting systems wherein a central location may broadcast facsimile information to a plurality of remote locations through radio transmission. It is readily apparent that such facsimile broadcasting systems are relatively complex, expensive and limited in the distance over which a successful transmission may obtain. Accordingly, these facsimile broadcasting systems have proven to be impractical for facsimile communication with remote office locations as contemplated by perceptive and innovative businessmen of today.

In recent years, much progress has been made in transmitting facsimile information over conventional telephone lines. It is manifest that a public telephone system is a vast system of existing communication paths which may be readily adapted for inexpensive facsimile transmission between remote office locations. Hence, the public telephone system exhibits the potential of providing communication paths between a plurality of remote office locations that may be randomly selected from a central location. Accordingly, the prompt transmission of data necessary to the efficient and proper functioning of most organizations may be readily effected through the telephone system.

Therefore, it is an object of the present invention to provide a method of and apparatus for establishing communication between a data transmitting device and one or more data receiving devices.

It is another object of the present invention to provide a method of and apparatus for transmitting data from a central location to one or more remote locations.

It is a further object of this invention to provide a method of and apparatus for establishing a communication channel between a remote location and a central location.

Yet another object of this invention is to provide a method of and apparatus for providing communication channels between a remote data transmitting device and one or more remote data receiving devices.

An additional object of this invention is to provide a method of and apparatus for enabling an operator at a central location to randomly establish plural communication channels between transmitting and receiving devices irrespective of the particular location of said devices.

Another object of the present invention is to provide a method of and apparatus for affording communication between randomly selected data transmitting and receiving devices via conventional telephone lines.

Still another object of this invention is to provide a facsimile braodcasting system including a plurality of remote facsimile transceivers and a local facsimile transceiver wherein facsimile information may be communicated therebetween.

It is a further object of the present invention to provide a manually operable switching system for establishing data transmission channels between randomly selectable devices.

Various other objects and advantages of the invention will become clear from the following detailed description of an exemplary embodiment thereof and the novel features will be particularly pointed out in connection with the appended claims.

In accordance with this invention, a method of establishing communication between a data transmitting device and one or more data receiving devices, and the apparatus therefor, is provided wherein one of a plurality of predetermined data transmitting devices is selected to transmit data; the capability of each of a plurality of data receiving devices to receive data is determined and one or more of the data receiving devices is selected to receive data; the data transmitting device selected to transmit data is supplied with an enabling signal to commence data information transmission; and the data information transmitted thereby is relayed to those data receiving devices selected to receive and capable of receiving data information. An indication is provided when a data receiving device not capable of receiving data information is erroneously selected to receive.

The invention will be more clearly understood by the reference to the following detailed description of an exemplary embodiment thereof in conjunction with the accompanying drawings in which.

The present invention finds ready application in a data communication system such as a telemetry system, a computer communication system, a facsimile system or the like. For the purpose of explanation, and to facilitate the ready understanding thereof, the instant invention will be described with reference to a facsimile communication system including a plurality of remote facsimile transceivers capable of transmitting and receiving facsimile information and a local facsimile transceiver capable of transmitting and receiving facsimile information. Nevertheless, it should be clearly understood that the present invention is not solely limited for use in a facsimile communication system. Hence, other conventional data transceivers or data transmitting and data receiving devices may be utilized in cooperation with the present invention.

Figure 1:
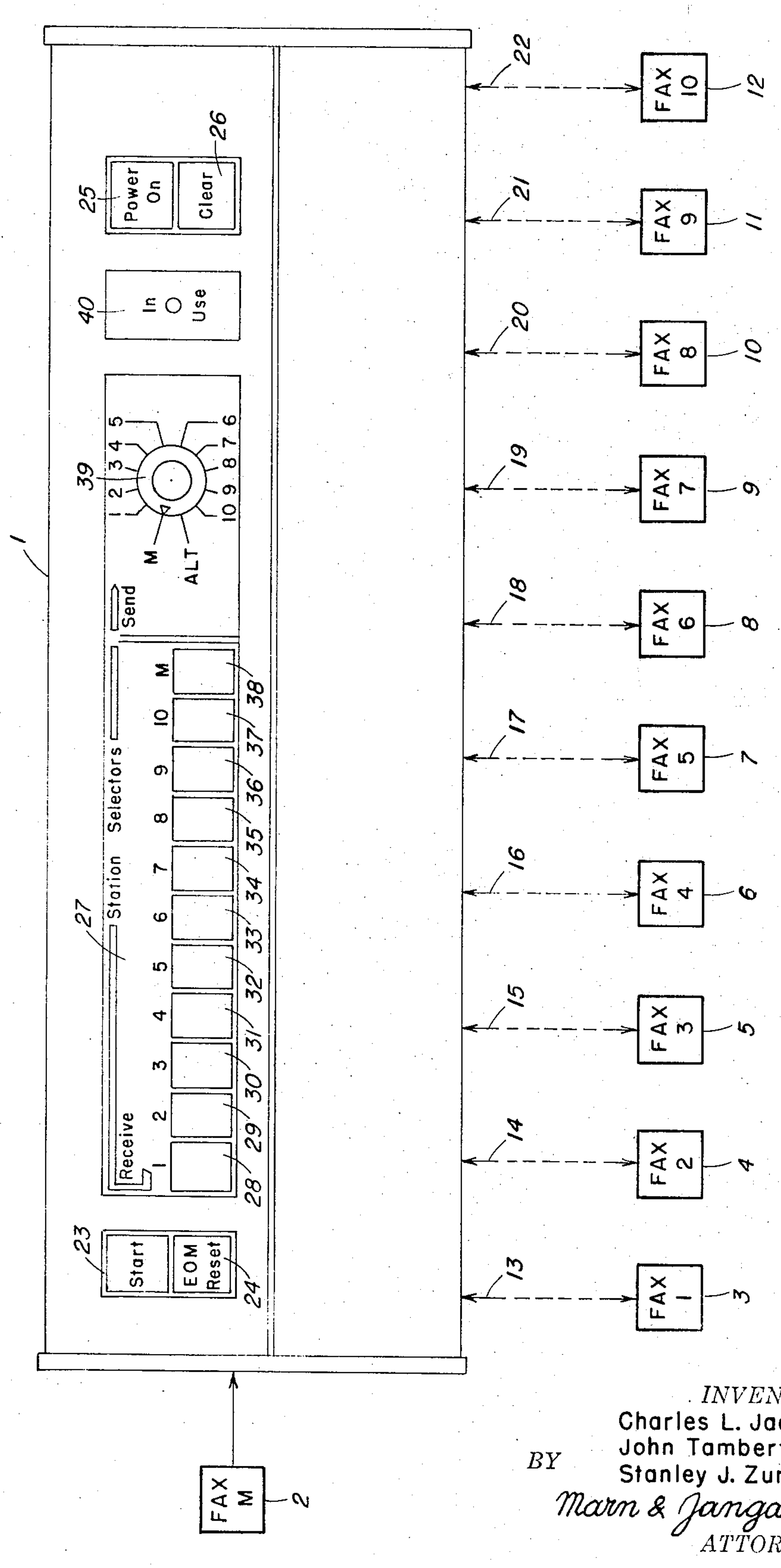
FIG. 1 is a representative diagram of manually operable apparatus that may be utilized in accordance with the present invention.

Referring now to the drawings, and in particular to FIG. 1, there is illustrated a representation of a manually operable switching system in accordance with the present invention which comprises station selecting means 1, a local facsimile transceiver 2 and a plurality of remote facsimile transceivers 3–12. The local facsimile transceiver 2 is adapted to transmit and receive facsimile information and is directly coupled to station selecting means 1 by conventional electrical connecting means. Each of the remote facsimile transceivers 3–12 is similar to the local facsimile transceiver 2 and is coupled to the station selecting means 1 via individual telephone lines 13–22. It will soon be seen that each of the telephone lines 13–22 may comprise telephone lines leased from the public telephone system and therefore permanently dedicated for use between an associated one of the remote facsimile transceivers and the station selecting means 1. Alternatively, each of the telephone lines may be seized in the conventional manner for transmission between an associated one of the remote facsimile transceivers and the station selecting means 1 by the dialing of an appropriate number. Hence, a telephone line may be seized by an operator at the station selecting means location or by an operator at a remote facsimile transceiver location. In the following description, it will be assumed that telephone lines 13–20 are leased telephone lines and telephone lines 21 and 22 are conventional subscriber telephone lines. Accordingly, facsimile transceivers 3–10 may be coupled to leased telephone lines 13–20 by any conventional coupling means such as the coupling means described in copending U.S. Pat. application Ser. No. 165,455 filed by the inventor of the present invention on even date herewith and assigned to Xerox Corporation, the assignee of the instant invention. Station selecting means 1 may be coupled to leased telephone lines 13–20 by similar coupling means. Facsimile transceivers 11 and 12 may be acoustically coupled to subscriber telephone lines 21 and 22 by conventional acoustic coupling apparatus. Station selecting means 1 may be similarly coupled to subscriber telephone lines 21 and 22. The local facsimile transceiver 2 and each of the remote facsimile transceivers 3–12 may be of the type produced by Xerox Corporation under the trade name Telecopier II or Telecopier III. It will be understood that any convenient number of remote facsimile transceivers may be used with the present invention.

Station selecting means 1 is adapted to establish a transmission path between one of the facsimile transceivers 2–12 and one or more of the remaining facsimile transceivers in accordance with the manual operation thereof. FIG. 1 illustrates a typical front panel that is included in the apparatus in accordance with the present invention and may be operated by a suitably skilled operator to effect the aforementioned transmission path. Although a description of FIG. 1 will not serve to explain the functions performed by the electrical circuitry comprising station selecting means 1, it will be seen that an understanding of the functions of the illustrated front panel will result in an appreciation of the advantages offered by the present invention. The illustrated front panel includes a START switch 23, a POWER ON switch 25, receive station selecting means 27, transmit station selecting means 39 and "In Use" indicating means 40. START switch 23 may be a conventional toggle switch, a push button switch, or the like. In addition, the START switch 23 may be constructed to include a suitable visual indicator such as a lamp whereby closing of the START switch 23 serves to energize the associated visual indicator. POWER ON switch 25 is similar to START switch 23 and also includes a suitable visual indicator such as a lamp. Accordingly, the closing of POWER ON switch 25 serves to energize the associated visual indicator. Receive station selecting means 27 is comprised of a plurality of switches 28-37, each being similar to the START switch 23. Each of the switches 28-37 is associated with a remote facsimile transceiver 3–12, respectively. In addition, receive station selecting means 27 includes a further switch 38 associated with local facsimile transceiver 2. The switch 38 is also similar to START switch 23. Each of the receive station selecting switches 28–38 is associated with a suitable visual indicator such as a lamp. In addition, each of the receive station selecting switches 28–38 is associated with audio indicating means that is actuated upon the erroneous closing of a receive station selecting switch. EOM reset switch 24 is similar to START switch 23 and is adapted to be manually activated upon the termination of a facsimile information transmission. The EOM reset switch 24 is also associated with a visual indicator such as a lamp and an audible tone generator that are adapted to be energized when a facsimile transmission is terminated. It will soon be seen that activation of EOM reset switch 24 serves to extinguish the associated energized visual indicator. A CLEAR switch 26, similar to START switch 23, is provided for resetting each of the receive station selecting switches 28–38 upon the manual operation of the CLEAR switch. The CLEAR switch 26 is also provided with a suitable visual indicator, such as a lamp, that may be selectively energized upon the closing of the CLEAR switch 26.

Transmit station selecting means 39 is adapted to select the local facsimile transceiver 2 or any one of the remote facsimile transceivers 3–12 to transmit facsimile information. Accordingly, the transmit station selecting means 39 may be provided with an individual switch associated with each of the facsimile transceivers 2–12 similar to switches 28–38. For a purpose soon to be described, the transmit station selecting means 39 is comprised of a multi-deck rotary switch having a plurality of contacts corresponding to the facsimile transceivers. The positioning of the transmit station selecting means 39 at any one of its plurality of contacts serves to extend a facsimile transmission channel to the associated facsimile transceiver. The transmit station selecting means 39 is provided with an additional contact identified as ALT to enable the capacity of the station selecting means 1 to be increased as will soon be described. Each contact of the transmit station selecting means 39 that corresponds to a facsimile transceiver is associated with a suitable visual indicator, such as a lamp, adapted to be energized in accordance with the positioning of the transmit station selecting means 39. It will soon become readily apparent that although the transmit station selecting means 39 is illustrated as being comprised of a rotary switch, the transmit station selecting means may include a plurality of push button or toggle switches similar to the switches 28–38.

The front panel of station selecting means 1 illustrated in FIG. 1 includes "In Use" indicating means 40. The "In Use" indicating means may comprise a suitable visual indicator such as a lamp that is adapted to be energized when one of the illustrated facsimile transceivers 2–12 is transmitting facsimile information.

Prior to a description of the electrical circuitry that comprises station selecting means 1, the manual operation by an operator of the station selecting means will now be described. The apparatus that is responsive to the manual operation of the station selecting means 1 will be described in detail hereinbelow. The following description of the apparatus illustrated in FIG. 1 will, however, enable one of ordinary skill in the art to appreciate the advantageous features characterizing the instant invention. For purposes of description only, switches 23, 24, 25, 26 and 28–38 are assumed to comprise push button switches. In addition, the visual indicators associated with each of said switches is assumed to comprise a lamp included in the structure of said switch. It is seen therefore, that each of the aforementioned switches are conventional and well known to those of ordinary skill in the art. Nevertheless, it is manifest that the present invention is not limited to the particular structure of the described switches and lamps therefore.

An operator desiring to establish facsimile transmission channels between plural facsimile transceivers initially depresses the POWER ON switch 25 to extend operating energy to the electrical apparatus comprising station selecting means 1. A "Power On" lamp associated with POWER ON switch 25 will be energized to provide a visual indication that operating energy has been extended to the electrical apparatus. Any one of the local or remote facsimile transceivers 2–12 may be selected to transmit facsimile information by appropriately positioning the transmit station selecting means 39. The positioning of transmit station selecting means 39 to one of its contacts establishes a transmission channel between the facsimile transceiver associated with that contact and station selecting means 1. As seen from FIG. 1, the local facsimile transceiver 2 may be selected by an operator to transmit facsimile information to one or more facsimile transceivers by positioning the transmit station selecting means 39 to station "M." In addition, the selecting of a particular facsimile transceiver to transmit facsimile information results in the illumination of an associated transmit lamp. For purposes of explanation, it is assumed that the transmit lamps associated with facsimile transceiver stations 1–10 and "M" are the same lamps included in the structure of receive station selecting switches 28–38. Alternatively, an individual bank of lamps may be provided to indicate which of the facsimile transceivers has been selected to transmit. Accordingly, in the illustrated embodiment, the selection of local facsimile transceiver 2 to transmit facsimile information results in the constant illumination of the lamp associated with switch 38.

At this time, the receiving capability of the remaining facsimile transceivers coupled to the leased telephone lines, i.e., facsimile transceivers 3–10, is indicated. Let it be assumed that each of the facsimile transceivers 3–10 is comprised of a Telecopier II or Telecopier III facsimile transceiver manufactured by Xerox Corporation. Such facsimile transceivers are capable of transmitting status signals representing that the facsimile transceiver is capable of receiving data. These status signals are transmitted regardless of whether the remote facsimile transceiver exhibits an attneded or unattended mode of operation. Failure of the facsimile transceiver to transmit a status signal denotes that said facsimile transceiver is not capable of receiving facsimile information because of a lack of paper, the facsimile transceiver does not admit of its receive mode of operation, in improper coupling to the telephone line, or the like. If facsimile transceivers 11 and 12 are assumed to comprise facsimile transceivers capable of acoustic coupling, such as the Telecopier II or Telecopier III, an analogous status signal is transmitted thereby upon establishing a suitable acoustic connection. Accordingly, those facsimile transceivers 3–12 capable of receiving facsimile information will transmit status signals to station selecting means 1 whereas those facsimile transceivers not capable of receiving facsimile information will not transmit status signals.

The receipt of a status signal is indicated by the extinguishing of an associated one of the lamps included in the switches 28–37. Conversely, the absence of a status signal is indicated by the flashing of an associated one of the lamps included in switches 28–37. For example, if it is assumed that only facsimile transceivers 3, 5, 7, 8, 10, 11 and 12 are capable of receiving facsimile information, then the lamps included in switches 28, 30, 32, 33, 35, 36 and 37 will be extinguished and the lamps associated with switches 29, 31 and 34 will be flashing. Consequently, an operator may now complete a communication channel between the selected local facsimile transceiver 2 and any one or more of the remote facsimile transceivers 3, 5, 7, 8, 10, 11 and 12. An operator should exercise caution in not selecting remote facsimile transceivers 4, 6 or 9 to receive facsimile information since these facsimile transceivers are not capable at this time of receiving such information.

Desired ones of remote facsimile transceivers 3–12 may now be selected to receive facsimile information by depressing those switches 28–37 having extinguished lamps. The selecting of a facsimile transceiver capable of receiving facsimile information is indicated by the illumination of an associated lamp. Accordingly, if switch means 28, 35 and 36, for example, are depressed, the lamps associated with switches 28, 35, and 36 will now be illuminated. It is understood that the remaining lamps will be extinguished if they are associated with facsimile receivers capable of receiving facsimile information but not selected to receive or will be flashing if they are associated with facsimile transceivers not capable of receiving. The depressing of switches 28, 35 and 36 establishes a communication channel from the local facsimile transceiver 2 selected to transmit to each of the remote facsimile transceivers 3, 10 and 11 selected to receive. If an operator erroneously depresses a receive station selecting switch associated with a facsimile transceiver not capable of receiving facsimile information, a communication channel is not extended thereto. In addition, the lamp associated with that erroneously depressed switch continues to flash and an alarm indicator is activated to apprise the operator of his erroneous selection. The alarm indicator may comprise an audio alarm, a visual alarm, or both. In a preferred embodiment of the present invention, the alarm indicator comprises an audio alarm such as a continuous audible tone. The audio alarm may be extinguished by deactivating the erroneously depressed receive station selecting switch. Accordingly, if switches 28–38 are comprised of the well-known push button switches wherein a first depression energizes the switch and a second depression de-energizes the switch, the audio alarm may be extingushed by again depressing the erroneously depressed switch means. Alternatively, the audio alarm may be extinguished by depressing the CLEAR switch 26. However, the CLEAR switch 26 is adapted to reset all receive station selecting switches to their respective initial quiescent conditions. Accordingly, the completed communication channels that were established by depressing desired ones of the switches 28–37 will be interrupted upon depressing the CLEAR switch 26. In addition, those lamps that were provided with a constant illumination indicating that a communication channel was extended to a facsimile transceiver to enable said facsimile transceiver to receive information will be extinguished by depressing CLEAR switch 26. Accordingly, if an audio alarm is sounded to indicate that a facsimile transceiver has been erroneously selected to receive facsimile information, the extinguishing of that audio alarm by depressing the CLEAR switch 26 will require an operator to perform the receive station selecting process once again. It is here noted that the depressing of CLEAR switch 26 will not interrupt the communication channel extended to that facsimile transceiver selected to transmit. Accordingly, the illuminated lamp associated with switch 38, indicating that local facsimile transceiver 2 has been selected to transmit, will not be extinguished. It sill soon be described that the depressing of a receive station selecting switch associated with a facsimile transceiver that has previously been selected to transmit will not affect the established communication channel. Hence, if switch 38 is now depressed, the selection of local facsimile transceiver 2 to transmit facsimile information will not be altered.

To initiate facsimile transmission between the selected local facsimile transceiver 2 and those selected remote facsimile transceivers, an operator need merely depress START switch 23. The depressing of START switch 23 will cause the lamp associated therewith to be illuminated and, in addition, will extend an enable signal to the facsimile transceiver selected to transmit. Upon receipt of the enable signal, the facsimile transceiver 2 will commence facsimile information transmission. During facsimile information transmission the "In Use" lamp 40 will be illuminated to apprise the operator that facsimile transmission is taking place. Accordingly, the operator should refrain from further operation of station selecting means 1. Although additional facsimile transceivers may be selected to receive during the transmission of facsimile information, the additionally selected facsimile transceivers will not be able to effectively utilize the facsimile information transmitted thereto. It is, of course, appreciated that if the position of transmit station selecting means 39 is now altered or if CLEAR switch 26 is depressed, facsimile transmission will be interrupted.

Upon completion of a facsimile message, facsimile transmission will terminate and the "In Use" lamp 40 will be extinguished. In addition, an "End of Message" lamp will be illuminated and an audio tone is generated to apprise the operator of the termination of facsimile transmission. The audio tone may be a pulsating tone distinct from the aforedescribed audio alarm. For purposes of explantion, the "End of Message" lamp is included in the structure of EOM reset switch 24. The "End of Message" lamp may be extinguished by depressing the EOM switch 24. At a predetermined time following the termination of a facsimile transmission, the communication channels extended to those facsimile transceivers that have previously been selected to receive will be interrupted. Furthermore, the illuminated lamps associated with those facsimile transceivers selected to receive will be extinguished and a "Clear" lamp associated with CLEAR switch 26 will be illuminated. Hence, the station selecting means 1 is returned to its initial or quiescent condition. It may be observed that during the interval of time between the termination of a facsimile transmission and the resetting of the station selecting means 1 to its initial condition, a subsequent facsimile transmission may be effected. The subsequent facsimile transmission is dependent solely upon the operation of the facsimile transceiver selected to transmit and requires no further operation on the part of the operator attending the station selecting means 1. If desired, the station selecting means 1 may be returned to its initial condition immediately subsequent to the termination of a facsimile transmission by depressing the CLEAR switch 26. Moreover, if it is determined that continuous facsimile transmissions are to obtain between predetermined stations, the communication channels extended to the facsimile transceivers disposed at those stations may be maintained in uninterrupted fashion.

The mode of operation wherein a remote facsimile transceiver is selected to transmit will now be described. After depressing the POWER ON switch 25, an operator may select an appropriate one of the remote facsimile transceivers 3–12 to transmit merely by positioning the transmit station selecting means 39 to an appropriate location. For example, if remote facsimile transceiver 8 is to transmit facsimile information, the transmit station selecting means 39 is set to position "6." Accordingly, a communication channel is extended to remote facsimile transceiver 8 via telephone lines 18 and the lamp associated with switch 33 is illuminated. The lamps associated with the remaining switches 28–32 and 34–38 will apprise the operator of the capability of each of the remaining facsimile transceivers to receive the facsimile information. It is recalled that if a facsimile transceiver is not capable of receiving facsimile information a status signal will not be transmitted thereby and the lamp included in the structure of the switch associated therewith will be flashing. However, those facsimile transceivers that are capable of receiving facsimile information will transmit status signals and the lamps included in the switches associated therewith will be extinguished. If local facsimile transceiver 2 and remote facsimile transceivers 3, 4 and 5 are capable of receiving facsimile information, then the lamps associated with switches 38, 28, 29 and 30, respectively, will be extinguished. The depressing of one or more of the switches 38, 28, 29 and 30 will extend communication channels to the associated facsimile transceivers 2, 3, 4 and 5. In addition, the lamps associated with switches 38, 28, 29 and 30 will now be illuminated. If a switch associated with a lamp that is flashing is erroneously depressed, an audio alarm will sound and a communication channel will not be extended to the associated facsimile transceiver. The communication channels extended to the facsimile transceivers properly selected to receive will not be affected thereby. The audio alarm may be extinguished by again depressing the erroneously depressed receive station selecting switch or by depressing CLEAR switch 26. If switch 33, associated with the remote facsimile transceiver 8 that has previously been selected to transmit, is depressed, the established communication channel to facsimile transceiver 8 is not disturbed but facsimile information will not be transmitted thereby. If, however, the position of transmit station selecting means 39 is altered, the communication channel extended to the remote facsimile transceiver 8 will be interrupted and the lamp associated with switch 33 will be extinguished. If the remote facsimile transceiver 8 is capable of receiving facsimile information, then the lamp associated with switch 33 will remain extinguished. However, if the remote facsimile transceiver 8 is not capable of receiving facsimile information, it is appreciated that the lamp associated with switch 33 will be flashing. The integrity of the communication channels extended to the facsimile transceivers that have been properly selected to receive is dependent upon the ultimate positioning of the transmit station selecting means 39. For example, if the transmit station selecting means 39 is now set to position "M," the previously established communication channel to the local facsimile transceiver 2 will be interrupted and a subsequent communication channel will be extended thereto. If, however, the local facsimile transceiver 2 does not admit of its transmit mode, then facsimile transmission will not ensue. A similar result obtains if the transmit station selecting means 39 is set to position "1." It should be noted however that once the transmit station selecting means 39 is rotated from position "M," the interrupted communication channel to the local facsimile transceiver 2 may subsequently be resumed in the aforedescribed manner.

Once an operator is satisfied with the communication channels that have been established from a facsimile transceiver selected to transmit to those facsimile transceivers selected to receive, the depressing of START switch 23 will initiate facsimile transmission. The subsequent operation of station selecting means 1 is similar to that previously described. Accordingly, in the interest of brevity further description thereof is not here provided.

It is observed that transmit station selecting means 39 is provided with an additional position "ALT." The "ALT" position enables a plurality of station selecting means to be combined, thereby increasing the system capacity. In the embodiment illustrated in FIG. 1 a station selecting means 1 is adapted to communicate with ten remote facsimile transceivers. It should be clearly understood that the number of remote facsimile transceivers with which station selecting means 1 may communicate is purely arbitrary and is not intended to provide a limitation for the present invention. However, if it is assumed that a single station selecting means may communicate with 10 remote facsimile transceivers, then two station selecting means may communicate with 20 remote facsimile transceivers, and so on. The combination of a plurality of station selecting means enables any one of the facsimile transceivers coupled thereto to be selected to transmit and any one or more of the remaining facsimile transceivers to be selected to receive notwithstanding the particular station selecting means to which the facsimile transceivers are coupled. For example, if local facsimile transceiver 2 is to transmit facsimile information to remote facsimile transceiver 10 then transmit station selecting means 39 is set to position "M" and receive station selecting switch 35 is depressed. If remote facsimile transceiver 8 is to transmit facsimile information to local facsimile transceiver 2 and to remote facsimile transceiver 3 then transmit station selecting means 39 is set to position "6" and receive station selecting switch means 38 and 28 are depressed. If now, remote facsimile transceiver 4 is to transmit facsimile information to a facsimile transceiver associated with another station selecting means, then transmit station selecting means 39 is set to position "2" and the appropriate receive station selecting switch of the other station selecting means is depressed. Further, if a facsimile transceiver associated with the other station selecting means is to transmit facsimile information to remote facsimile transceivers 5 and 7, then transmit station selecting means 39 is set to position "ALT" and receive station selecting switches 30 and 32 are depressed. Finally, if none of facsimile transceivers 2–12 is to transmit or receive facsimile information then transmit station selecting means 39 is set to position "ALT" and none of the received station selecting means is depressed.

It is noted that, since station selecting means 1 and remote facsimile transceivers 3–12 may be coupled to leased telephone lines by the coupling means described in aforementioned U.S. Pat. application Ser. No. (P/2176), the instant invention admits of an unattended mode of operation as described in detail in said application.

Figures 2, 3, 4:
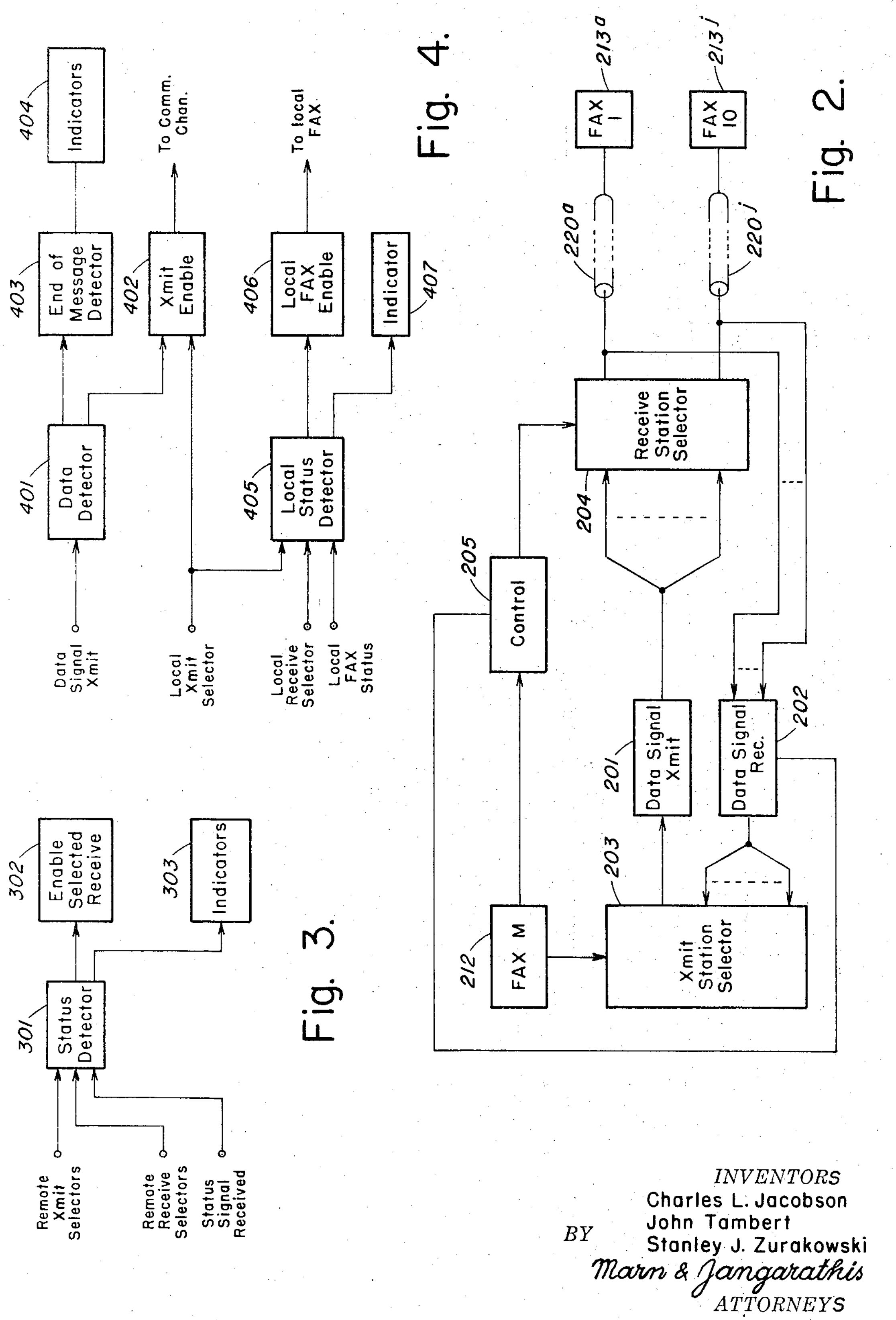
FIG. 2 is a block diagram of the electrical apparatus in accordance with the present invention.
FIG. 3 is a block diagram of a portion of one of the blocks illustrated in FIG. 2.
FIG. 4 is a block diagram of another portion of one of the blocks illustrated in FIG. 2.

The electrical apparatus comprising the station selecting means 1 and the manner in which said apparatus responds to the manual operation of the illustrated switching system of FIG. 1 will now be described. FIG. 2 illustrates a block diagram of apparatus for establishing communication channels between a data transmitting device and one or more data receiving devices and comprises data signal transmit means 201, data signal receive means 202, transmit station selecting means 203, receive station selecting means 204 and control means 205. Data signal transmit means 201 is adapted to receive facsimile information transmitted thereto from a facsimile transceiver selected to transmit and to retransmit said facsimile information to those facsimile transceivers selected to receive. The data signal transmit means 201 includes wave shaping means for shaping the transmitted facsimile information signal in a manner such that the signals are compatible with the communication medium extended to each of the facsimile transceivers. It is recalled that the remote facsimile transceivers, illustrated herein as facsimile transceivers 213*a* . . . 213*j*, are coupled to conventional telephone lines 220*a* . . . 220*j*. The data signal transmit means 201 is interconnected between transmit station selecting means 203 and receive station selecting means 204.

Data signal receive means 202 is adapted to supply data signal transmit means 201 with facsimile information signals transmitted thereto over telephone lines 220*a* . . . 220*j*. In addition, data signal receive means 202 is capable of supplying control means 205 with signals representing the status of remote facsimile transceivers 213*a* . . . 213*j*. Accordingly, data signal receive means 202 includes a plurality of input terminals coupled to associated ones of remote facsimile transceivers 213*a* . . . 213*j* via telephone lines 220*a* . . . 220*j*. The output terminals of data signal receive means 202 are coupled to transmit station selecting means 203. The transmit station selecting means 203 serves to couple the facsimile information data signals received from a facsimile transceiver selected to transmit to data signal transmit means 201. Accordingly, transmit station selecting means 203 corresponds to transmit station selecting means 39 previously described with reference to FIG. 1 and may comprise a multi-deck rotary switch means having a plurality of stationary contacts and a movable contact. Each stationary contact may be coupled to a respective output terminal of data signal receive means 202. An additional stationary contact may be coupled to the local facsimile transceiver 212 and is adapted to receive facsimile information signals therefrom. The movable contact is coupled to data signal transmit means 201. Accordingly, a selected one of the output terminals of data signal receive means 202 may be connected to the input terminal of data signal transmit means 201 in accordance with the positioning of the movable contact of transmit station selecting means 203. In addition, the movable contact admits of a predetermined position wherein the local facsimile transceiver 212 is coupled to the input terminal of data signal transmit means 201. It will soon be seen that, if desired, transmit station selecting means 203 may comprise a bank of individually operated switch means, each admitting of an open and closed position. It is understood that the function performed by a bank of individually operated switch means is identical to the function performed by a rotary switch means. Other equivalent embodiments of transmit station selecting means 203 will become obvious to those skilled in the art.

Receive station selecting means 204 is coupled to data signal transmit means 201 and is adapted to establish a communication channel between data signal transmit means 201 and those facsimile transceivers selected to receive. The receive station selecting means 204 may comprise a plurality of activatable switching means corresponding in number to the remote facsimile transceiver 213*a* . . . 213*j*. The activatable switching means are operated under the control of control means 205 and serve to complete a connection between the output terminal of data signal transmit means 201 and selected ones of telephone lines 220*a* . . . 220*j* to which the remote facsimile transceivers 213*a* . . . 213*j* are coupled.

Control means 205 is coupled to receive station selecting means 204 and is adapted to assure that a facsimile transceiver capable of receiving data is properly selected. Accordingly, the control means 205 is capable of supplying activating signals to receive station selecting means 204 whereby the activatable switching means included therein are operated. The control signals supplied to receive station selecting means 204 are derived from signals generated by the manual operation of switching devices such as the switching means illustrated in FIG. 1. The aforementioned status signals received from the remote facsimile transceivers 213*a* . . . 213*j* by data signal receive means 202, together with analogous status signals generated by the local facsimile transceiver 212, are supplied to control means 205 whereat they are utilized in generating suitable control signals. Control means 205 is also responsive to transmit station selecting means 203 to extend a transmission enable signal to that facsimile transceiver selected by transmit station selecting means 203 to transmit. Furthermore, error signals are produced by control means 205 to indicate an erroneous manual operation performed by an operator. Finally the control means 205 is adapted to control the transmission of facsimile information to and from the local facsimile transceiver 212. The control means 205 is described in more detail hereinbelow with respect to FIGS. 3 and 4 and is comprised of the logic circuits illustrated in FIGS. 6, 7 and 8.

The operation of the apparatus illustrated in FIG. 2 will now be described. The control means 205 will be described only to the extent necessary to facilitate an understanding of the operation of the apparatus illustrated in FIG. 2. A complete description of the control means 205 is set forth hereinbelow with reference to the block diagrams of FIGS. 3 and 4 and the logic circuits of FIGS. 6, 7 and 8. It is clear that the electrical apparatus of FIG. 2 comprises the substance of the station selecting means previously described with reference to FIG. 1 and therefore is operable in response to an operator initiated action. Accordingly, the electrical apparatus is supplied with operating energy derived from a suitable source of energy upon the depressing of the POWER ON switch 25 illustrated in FIG. 1. Transmit station selecting means 203 couples the input terminal of data signal transmit means 201 with a desired one of the output terminals of data signal receive means 202. This is readily accomplished by positioning the movable contact of the transmit station selecting means 203 at an appropriate stationary contact. This corresponds to the aforedescribed positioning of transmit station selecting means 39.

At this time, status signals representing the capability of the remote facsimile transceivers 213a . . . 213j are selectively transmitted thereby and received by data signal receive means 202 over telephone lines 220a . . . 220j. It is seen that the data signal receive means 202 is directly coupled to the telephone lines 220a . . . 220j and therefore, the receipt of the status signals is not dependent upon the operation of receive station selecting means 204. If a status signal is received, data signal receive means 202 identifies the particular remote facsimile transceiver 213a . . . 213j from which the status signal originates and supplies control means 205 with a manifestation of the detected status signal. The status signal may be a particular d.c. level, a pulse coded signal, an a.c. signal admitting of a predetermined frequency, or the like. In a preferred embodiment of the present invention the status signal is an a.c. signal admitting of a predetermined frequency. Accordingly, data signal receive means 202 may include a plurality of suitable tone detectors coupled to corresponding ones of telephone lines 220a . . . 220j.

Control means 205 includes suitable circuitry, soon to be described in detail, that is responsive to the detection of the status signals by data signal receive means 202 to provide visual indications of the status of the remote facsimile transceivers 213a . . . 213j. Hence, control means 205 is coupled to each of the tone detectors included in data signal receive means 202 and, in addition, includes a plurality of lamps corresponding to the remote facsimile transceiver 213a . . . 213j. It is appreciated, therefore, that the lamps included in control means 205 may be identical to the lamps previously described with respect to switches 28–37 of FIG. 1. Thus, it is seen that if facsimile transceiver 213a, for example, is capable of receiving facsimile information, a status signal will be transmitted thereby over telephone line 220a and received by an associated one of the tone detectors included in data signal receive means 202. The tone detector to which the status signal is supplied supplies control means 205 with a representative signal whereupon the lamp included in control means 205 and associated with the facsimile transceiver 213a is extinguished. If facsimile transceiver 213b, for example, is not capable of receiving facsimile information, a status signal will not be generated thereby. Accordingly, the tone detector included in data signal receive means 202 and associated with the facsimile transceiver 213b will not receive a status signal from the telephone line 220b coupled thereto. Hence, the tone detector associated with facsimile transceiver 213b will not supply control means 205 with a signal representative of the detection of a status signal. Consequently, the lamp included in control means 205 and associated with the facsimile transceiver 213b will not be extinguished but will be flashing. In a manner identical to that just described, data signal receive means 202 will receive status signals from those remote facsimile transceivers 213a . . . 213j capable of receiving facsimile information, and will apprise control means 205 thereof. Control means 205 will, in turn, produce visual indications representing the status of each of the remote facsimile transceivers 213a . . . 213j.

Local facsimile transceiver 212 is directly coupled to control means 205 and, therefore, may directly apprise the control means 205 of the capability thereof to receive facsimile information. Hence, an analogous status signal is transmitted from the local facsimile transceiver 212 to control means 205 whereat a visual indication of the status of the local facsimile transceiver 212 is produced. This visual indication may be provided by the selective illumination of a lamp similar to the lamp associated with switch 38 previously described with reference to FIG. 1. It will be seen from the forthcoming description that the analogous status signal transmitted by facsimile transceiver 212 represents that the local facsimile transceiver is in its receive mode and is provided with a suitable supply of paper upon which received facsimile information is recorded. The analogous status signal may be a d.c. level, a pulse coded signal, or an a.c. signal admitting of a predetermined frequency. In the preferred embodiment of the present invention, the analogous status signal is comprised of a logic signal which may be a d.c. level.

The control means 205 is now prepared for the manual operation whereby one or more facsimile transceivers are selected to receive facsimile information. Such manual operation may be effected by the closing of switches such as the selective depressing of switches 28–38 illustrated in FIG. 1. The manual operation of the switches produces select signals that are combined with the detected response of the data signal receive means 202 to received status signals to supply receive station selecting means 204 with selective activating signals. Thus, an activating signal associated with a remote facsimile transceiver will be generated if data signal receive means 202 receives a status signal from said remote facsimile transceiver and a switch associated with that remote facsimile transceiver is manually operated. In accordance with the previously assumed example, a status signal is detected by data signal receive means 202 from remote facsimile transceiver 213a. If the switch associated with the remote facsimile transceiver 213a, such as switch 28 of FIG. 1, is manually operated, the select signal generated thereby is combined with the signals supplied to the control means 205 by data signal receive means 202 representative of the detection of a status signal. Consequently, an activating signal is supplied to receive station selecting means 204 by control means 205. Should a switch associated with a remote facsimile transceiver not capable of receiving facsimile information be erroneously operated, e.g., should a switch associated with a flashing lamp be depressed, control means 205 provides an indication of erroneous operation and an activating signal will not be supplied to receive station selecting means 204. Thus, if a switch associated with remote facsimile transceiver 213b, such as the switch 29 illustrated in FIG. 1, is manually operated, a select signal will be produced by control means 205. However, data signal receive means 202 has not detected a status signal received from the remote facsimile transceiver 213b and, therefore, the data signal receive means 202 will not supply control means 205 with a signal representative of the detection of a status signal. Consequently, the select signal produced by the manual operation of the switch, such as switch 29, is not combined with a representative signal. Hence, a resulting activating signal is not generated. The control means 205 includes further circuitry to detect the presence of a select signal and the absence of a signal representative of the detection of a status signal to produce an audio alarm signal. The audio alarm signal is supplied to a suitable alarm tone generator similar to that described with reference to FIG. 1 to thereby indicate an erroneous manual operation. It will become clear from the forthcoming description of control means 205 that the control means includes individual circuits associated with each of the facsimile transceivers such that the erroneous manual operation of one switch has no debilitating effect upon the correct manual operation of another switch.

A select signal is produced upon the manual operation of the switch associated with the local facsimile transceiver 212, such as switch 38 of FIG. 1. This select signal is combined with the analogous status signal generated by the local facsimile transceiver 212 to produce a further activating signal. The further activating signal is supplied directly by the control means 205 to the local facsimile transceiver 212 to enable the local facsimile transceiver to receive facsimile information subsequently transmitted. An erroneous manual operation of the switch associated with the local facsimile transceiver 212, i.e., a depressing of switch 38 of FIG. 1, results in the production of a select signal in the absence of an analogous status signal. Accordingly, control means 205 produces an audio alarm signal similar to that produced upon the erroneous manual operation of a switch such as switches 28–37, described hereinabove.

The activatable switch means included in receive station selecting means 204 are responsive to the activating signal supplied thereto by control means 205. Accordingly, if an activating signal is supplied to receive station selecting means 204 by control means 205 in response to the manual operation of the switch associated with facsimile transceiver 213*a*, then an activatable switch means is closed to provide an electrical connection between data signal transmit means 201 and the telephone line 220*a*. It is seen therefore, that the activatable switch means included in receive station selecting means 204 are effective to establish communication channels between data signal transmit means 201 and selected ones of the remote facsimile transceivers 213*a* . . . 213*j* under the control of control means 205. It will be seen from the more detailed description set forth hereinbelow that a fixed communication channel is provided between data signal transmit means 201 and local facsimile transceiver 212 to enable the local facsimile transceiver to receive transmitted facsimile information. However, the operation of the local facsimile transceiver 212 in response to the received facsimile information is strictly regulated in accordance with the signal produced by control means 205.

It is here noted that control means 205 includes additional circuitry, described in detail below, for inhibiting the simultaneous selection of a given facsimile transceiver to both transmit and receive facsimile information. The manual operation of transmit station selecting means 203 produces a signal identifying the particular facsimile transceiver selected to transmit. This signal is applied to control means 205 whereat it inhibits the production of an activating signal if a switch associated with the facsimile transceiver selected to transmit is manually operated.

The audio alarm signal generated by control means 205 in response to the erroneous production of a select signal is extinguished by terminating the erroneously produced select signal. This is achieved by opening the switch that has been erroneously manually operated or by generating a "Clear" signal that automatically opens each of the manually operated switches. The opening of a manually operated switch has been described in detail with respect to the operation of receive station selecting switches 28–38 of FIG. 1 and need not be further described herein. The "Clear" signal is generated by control means 205 in response to the manual operation of a clear switch such as CLEAR switch 26 of FIG. 1. It is now appreciated that if the erroneously produced select signal is terminated by the manual operation of the CLEAR switch, the aforedescribed process of selecting one or more facsimile transceivers to receive facsimile information must be repeated.

The apparatus illustrated in FIG. 2 is adapted for facsimile transmission upon the appropriate positioning of transmit station selecting means 203 and the activation of receive station selecting means 204. The input terminal of data transmit means 201 is thus connected to one of the stationary contacts included in transmit station selecting means 203 through the moveable contact thereof, and the output terminal of data signal transmit means 201 is connected to one or more of the telephone lines 220*a* . . . 220*j*. Continuous communication channels are thereby established from data signal receive means 202 through transmit station selecting means 203 to data signal transmit means 201, and from data signal transmit means 201 through receive station selecting means 204 to selected ones of the telephone lines 220*a* . . . 220*j*. It is recognized that if local facsimile transceiver 212 is selected to transmit facsimile information, then continous communication channels are established between the local facsimile transceiver 212 through transmit station selecting means 203 to data signal transmit means 201, and from data signal transmit means 201 through receive station selecting means 204 to selected ones of the telephone lines 220*a* . . . 220*j*. Facsimile transmission is initiated by a manual operation that causes control means 205 to generate an enabling signal. The generated enabling signal is applied by control means 205 to that telephone line 220*a* . . . 220*j* associated with the stationary contact at which the movable contact of transmit station selecting means 203 is positioned. It will be seen from the description offered hereinbelow that if the movable contact of transmit station selecting means 203 is positioned at the stationary contact to which the local facsimile transceiver 212 is connected, the enabling signal generated by control means 205 is applied directly to the local facsimile transceiver 212. Thus, the applied enabling signal is transmitted to that facsimile transceiver selected by transmit station selecting means 203 to transmit facsimile information. It is recognized that a facsimile transceiver similar to the aforementioned Telecopier II or Telecopier III facsimile transceiver automatically responds to the received enabling signal to commence transmission of facsimile information. Facsimile information is transmitted by the facsimile transceiver selected to transmit, via the telephone line coupled thereto to data signal receive means 202. The waveform of the facsimile information signal received by data signal receive means 202 is appropriately shaped and is coupled to data signal transmit means 201 by transmit station selecting means 203. Data signal transmit means 201 further shapes the waveform of the facsimile information signal in a manner that is compatible for transmission over selected ones of the telephone lines 220*a* . . . 220*j*. Receive station selecting means 204 receives the further shaped facsimile information signal and applies such facsimile information signal to selected ones of the telephone lines 220*a* . . . 220*j* in accordance with the activatable switch means included therein that have been controlled by control means 205. Thus, it is seen that facsimile information is transmitted over the telephone lines to the remote facsimile transceivers that have been selected by receive station selecting means 204 in cooperation with control means 205 to receive. It should be readily apparent that if the local facsimile transceiver 212 has been properly selected to receive facsimile information, the further shaped facsimile information signal provided by data signal transmit means 201 is applied therefrom to the local facsimile transceiver. Similarly, if the local facsimile transceiver 212 is selected to transmit, a facsimile information signal is supplied by the local facsimile transceiver to transmit station selecting means 203 which, in turn, applies the facsimile information signal to data signal transmit means 201.

The completion of a facsimile transmission is detected by control means 205 which provides an indication thereof. Suitable circuitry, such as a time delay circuit, responds to said indication to produce a "Clear" signal at a predetermined time subsequent to the completion of a facsimile transmission.

It is recalled that the "Clear" signal is effective to terminate each select signal produced by control means 205, thereby deactivating each of the previously activated switches included in receive station selecting means 204. Accordingly, data signal transmit means 201 is disconnected from each of the telephone lines 220*a* . . . 220*j*. The "Clear" signal is further effective to terminate the signal supplied to the local facsimile transceiver 212 by control means 205 whereby the local facsimile transceiver is no longer operable on received facsimile information signals. Should a subsequent facsimile transmission ensue prior to the generation of the "Clear" signal, control means 205 will generate the "Clear" signal only after completion of the subsequent facsimile transmission. However, the "Clear" signal may be generated at any time in accordance with the manual operation of a clear switch such as by depressing the CLEAR switch 26 illustrated in FIG. 1. The deactivation of receive station selecting means 204 returns the illustrated apparatus to its initial or quiescent condition whereby the apparatus is prepared to establish further communication channels between plural facsimile transceivers in the aforedescribed manner.

Although the foregoing has described manual operation initiated by an operator, the inherent nature of the leased line coupling device that may be utilized with the present invention, as disclosed in copending application Ser. No. 165,455, enables an unattended mode of operation wherein facsimile information may be automatically transmitted and received in response to a remote request.

In light of the foregoing description, it is manifest that control means 205 controls the operation of receive station selecting means 204 and the operation of the local facsimile transceiver 212. Control means 205 also functions to initiate a facsimile transmission and to detect the completion thereof. A block diagram of the portion of control means 205 that serves to regulate the operation of receive station selecting means 204 is illustrated in FIG. 3 and comprises status detecting means 301, enable selected receive means 302 and indicating means 303. Status detecting means 301 is adapted to monitor the capability of each of the remote facsimile transceivers to receive facsimile information. Status detecting means 301 is thus supplied with signals representing that status signals have been received from the remote facsimile transceivers. Status detecting means 301 is further supplied with select signals produced by the manual operation of switches such as the receive station selecting switches illustrated in FIG. 1. In addition, status detecting means 301 is provided with a signal identifying the remote facsimile transceiver that has been selected to transmit. A first output terminal of status detecting means 301 is coupled to enable selected receive means 302 and a second output terminal of status detecting means 301 is coupled to indicating means 303.

Enable selected receive means 302 is adapted to enable a communication channel to be extended to those remote facsimile transceivers selected to receive in accordance with the signals supplied thereto by status detecting means 301. Accordingly, enable selected receive means 302 may comprise a plurality of activating means each being associated with a corresponding one of the switch means included in receive station selecting means 204. A signal supplied to one of the activating means of enable selected receive means 302 by status detecting means 301 results in the activation of the corresponding one of the switch means of receive station selecting means 204.

Indicating means 303 may comprise a plurality of visual indicating means each being associated with a corresponding one of the remote facsimile transceivers. The indicating means 303 are selectively energized by signals supplied thereto by status detecting means 301 to provide visual indications of the status of each of the remote facsimile transceivers. The indicating means 303 may therefore comprise a plurality of lamps such as the lamps associated with receive station selecting switches 28–37 of FIG. 1. Briefly, each of the indicating means 303 serves to provide a first indication when an associated remote facsimile transceiver is not capable of receiving facsimile information, a second indication when the associated facsimile transceiver is capable of receiving facsimile information and a third indication when the associated facsimile transceiver has been properly selected to receive or transmit facsimile information. It is recalled that the first indication may be provided by a flashing lamp, the second indication may be provided by an extinguished lamp and the third indication may be provided by a lamp admitting of constant illumination.

A complete description of the block diagram illustrated in FIG. 3 is provided hereinbelow with reference to the logic circuit illustrated in FIG. 6. Nevertheless, a brief analysis of the operation of the block diagram is provided to facilitate a ready understanding of the instant invention. Status detecting means 301 is responsive to a status signal received from a remote facsimile transceiver to supply indicating means 303 with an appropriate signal to extinguish the lamp associated with that remote facsimile transceiver. It is recalled that a status signal represents that the remote facsimile transceiver is capable of receiving facsimile information. Thus, status detecting means 301 is coupled to the data signal receive means 202 previously described with reference to FIG. 2. More particularly, the status detecting means 301 may include a plurality of input terminals each coupled to a corresponding one of the tone detecting means included in the status signal receive means 202. It should be appreciated that if status detecting means 301 is not provided with a signal from one of the tone detecting means, a corresponding one of the indicating means 303 is not supplied with an extinguishing signal and said corresponding one of the indicating means 303 exhibits a pulsating illumination.

Each of the select signals generated by the manual operation of the receive station selecting switches illustrated in FIG. 1 is supplied to status detecting means 301. Status detecting means 301 compares each select signal with a corresponding status signal. If a remote facsimile transceiver that is capable of receiving facsimile information is selected to receive then status detecting means 301 will be supplied with a select signal and a status signal for that facsimile transceiver. Accordingly, enable selected receiver means 302 will be provided with an activating signal to enable a communication channel to be extended to that remote facsimile transceiver. In addition, a corresponding one of the indicating means 303 will be provided with a suitable signal such that the indicating means exhibits a constant illumination. However, if a remote facsimile transceiver that is not capable of receiving facsimile information is selected to receive, then status detecting means 301 will be supplied with a select signal but not with a status signal. Hence, an activating signal is not transmitted to enable selected receive means 302 and a communication channel is not extended to that remote facsimile transceiver. Moreover, the combination of a produced select signal and the absence of a status signal is indicative of an erroneous selection of a remote facsimile transceiver. Accordingly, a corresponding one of the indicating means 303 is not supplied with an extinguishing signal to extinguish the pulsating illumination thereof. Status detecting means 301 includes further means that responds to a select signal associated with a remote facsimile transceiver that is not capable of receiving facsimile information to generate an audio alarm signal. It is now recognized that the audio alarm signal serves to apprise an operator of an erroneous manual operation.

The signal that identifies the particular remote facsimile transceiver that has been selected to transmit facsimile information is utilized by status detecting means 301 to prevent an erroneous selection of that same facsimile transceiver to receive. Thus, an activating signal is not supplied to enable selected receive means 302 by status detecting means 301 if a select signal, a status signal and an identifying signal, all associated with the same remote facsimile transceiver, are applied to status detecting means 301. Nevertheless, application to status detecting means 301 of the signal identifying the particular remote facsimile transceiver that has been selected to transmit is effective to supply a corresponding one of the indicating means 303 with an illuminating signal. Consequently, one of the indicating means 303 will exhibit a constant illumination indicating that the corresponding remote facsimile transceiver has been selected to transmit facsimile information. Upon the completion of a facsimile transmission, each of the selected signals supplied to status detecting means 301 si terminated. Hence, status detecting means 301 returns to its initial quiescent condition. Accordingly, the activating signals and constant illumination signals supplied to enable selected receive means 302 and indicating means 303, respectively, are terminated.

A block diagram of the portion of control means 205 that serves to regulate the operation of the local facsimile transceiver, initiate a facsimile transmission and detect the completion of a facsimile transmission is illustrated in FIG. 4 and comprises data detecting means 401, transmit enable means 402, local status detecting means 405 and local facsimile enable means 406. Data detecting means 401 is adapted to detect the transmission of facsimile information to a facsimile transceiver by the data signal transmit means 201 of FIG. 2. A complete description of data detecting means 401 is set forth hereinbelow with reference to FIG. 7. It is sufficient for a ready understanding of the block diagram of FIG. 4 to note that data detecting means 401 is capable of detecting characteristic signals that are transmitted only during a facsimile transmission. Accordingly, data detecting means 401 includes an input terminal coupled to the output of data signal transmit means 201.

An output terminal of data detecting means 401 is coupled to transmit enable means 402 for a purpose soon to be described. Transmit enable means 402 is adapted to generate an enabling signal that is transmitted to the remote facsimile transceiver selected to transmit facsimile information. Accordingly, transmit enable means 402 is comprised of a suitable signal generator such as a pulse signal generator, an a.c. signal generator or the like. In the preferred embodiment of the present invention, the enabling signal is an a.c. signal admitting of a predetermined frequency. Hence, transmit enable means 402 is preferably comprised of an a.c. signal generator. The output terminal of transmit enable means 402 is selectively coupled through suitable switching means to the telephone line to which the remote facsimile transceiver is coupled. The switching means may thus be similar to the transmit station selecting means 203 of FIG. 2 and is adapted for simultaneous operation therewith such that an enabling signal is transmitted to the remote facsimile transceiver that has been selected to transmit facsimile information. It should be clearly recognized by those of ordinary skill in the art that the transmission of an enabling signal to a remote facsimile transceiver that is in the process of transmitting facsimile information will result in the degradation and distortion of the transmitted facsimile information. Accordingly, it is preferred not to transmit the enabling signal during a facsimile transmission. Hence, transmit enable means 402 is provided with a first inhibit input terminal to which data detecting means 401 is coupled.

Data detecting means 401 is additionally coupled to end of message detecting means 403. The end of message detecting means 403 is capable of detecting the completion of a facsimile transmission and for providing a signal indicative thereof. A further description of end of message detecting means 403 and the manner in which the completion of a facsimile transmission is detected is set forth hereinbelow with reference to FIG. 7. Suffice it to say, however, the termination of the characteristic signals transmitted during a facsimile transmission is detected. Indicating means 404 are coupled to end of message detecting means 403 to provide an indication of the completion of a facsimile transmission. Accordingly, indicating means 404 may comprise a suitable visual indicating means, such as the lamp previously described with respect to EOM reset switch 24 illustrated in FIG. 1, together with an audio tone generator.

Local status detecting means 405 is similar to aforedescribed status detecting means 301 and serves to perform an analogous function. Accordingly, local status detecting means 405 is adapted to monitor the capability of the local facsimile transceiver to receive or transmit facsimile information. Local status detecting means 405 is therefore directly coupled to the local facsimile transceiver and is responsive to analogous status signals representing the capability of the local facsimile transceiver to receive or to transmit facsimile information. Also, local status detecting means 405 is adapted to receive a select signal produced upon the manual operation of a switch such as switch 38 of FIG. 1. Furthermore, a signal identifying that the local facsimile transceiver has been selected to transmit facsimile information is supplied to local status detecting means 405. Hence, local status detecting means 405 may be coupled to an appropriate one of the stationary contacts included in the switch means comprising transmit station selecting means 203.

An output terminal of local status detecting means 405 is coupled to local facsimile enable means 406 which is adapted to regulate the appropriate operation of the local facsimile transceiver in accordance with the manifestations received from local status detecting means 405. Local facsimile enable means 406 will be described in more detail hereinbelow with reference to FIG. 8. Local status detecting means 405 is additionally coupled to indicating means 407. Indicating means 407 may comprise a visual indicating means such as a lamp similar to the lamp associated with receive station selecting switch 38, and is capable of indicating the particular status exhibited by the local facsimile transceiver. In addition, indicating means 407 may include an audio alarm indicator that is activated when the local facsimile transceiver is erroneously selected to receive facsimile information. It will be apparent that indicating means 407 provides a first visual indication, such as a pulsating illumination, when the local facsimile transceiver is not capable of receiving information.

A second indication, such as an extinguished lamp, is provided when the local facsimile transceiver is capable of receiving information. And a third indication, such as a constant illumination, is provided when the local facsimile transceiver is properly selected to transmit or to receive facsimile information.

In operation, local status detecting means 405 is supplied with signals representing the status of the local facsimile transceiver. For example, if the local facsimile transceiver admits of its receive mode of operation and paper upon which received facsimile information is recorded is suitably supplied, then a signal is applied to local status detecting means 405 representing that the local facsimile transceiver is capable of receiving facsimile information. Similarly, if the local facsimile transceiver admits of its transmit mode then local status detecting means 405 is provided with a signal representing that the local facsimile transceiver is capable of transmitting facsimile information. It is noted that facsimile transceivers similar to the Telecopier II or Telecopier III facsimile transceiver automatically produce the aforementioned status signals. Hence, these signals will automatically be supplied to local status detecting means 405 if the local status detecting means is directly coupled to the local facsimile transceiver. It should now be appreciated that a select signal is applied to local status detecting means 405 upon the manual operation of the appropriate receive station selecting switch. The local status detecting means 405 compares the local facsimile status signals supplied thereto with the produced select signal to determine if the local facsimile transceiver has been properly selected to receive. Hence, if the local facsimile transceiver is capable of receiving facsimile information and the local facsimile transceiver has been selected to receive then local status detecting means 405 responds to the two signals supplied thereto to apply an activating signal to local facsimile enable means 406. Receipt of this activating signal by local facsimile enable means 406 results in a suitable control signal applied to the local facsimile transceiver whereby the local facsimile transceiver is enabled to execute a receive operation. In addition, an illuminating signal is applied to indicating means 407 by local status detecting means 405 whereby a constant illumination is provided indicating that the local facsimile transceiver has been properly selected to receive.

Local status detecting means 405 also receives a signal that is generated when the local facsimile transceiver is selected to transmit. It is recalled that this signal is generated in response to the appropriate manual operation of transmit station selecting means 203 and serves to identify the particular facsimile transceiver selected to transmit. Local status detecting means 405 compares the local facsimile status signals and the generated identifying signal supplied thereto to determine if the local facsimile transceiver has been properly selected to transmit. Accordingly, local status detecting means 405 supplies local facsimile enable means 406 with an appropriate activating signal when the local facsimile transceiver admits of its transmit mode of operation and the local facsimile transceiver has been selected to transmit. Local facsimile enable means 406 responds to the applied activating signal to supply the local facsimile transceiver with a suitable control signal whereby the local facsimile transceiver is enabled to execute a transmit operation. In addition, local status detecting means 405 supplies indicating means 407 with an illuminating signal to effect the constant illumination of the visual indicating means, thereby indicating that the local facsimile transceiver has been selected to transmit.

It is observed that if a select signal is applied to local status detecting means 405 in the absense of a local facsimile status signal representing that the local facsimile transceiver is capable of receiving, local facsimile enable means 406 is not supplied with an activating signal. Moreover, the absence of a suitable local facsimile status signal is sensed and local status detecting means generates an appropriate audio alarm signal to indicate the erroneous selection of the local facsimile transceiver to receive facsimile information. Similarly, if the local facsimile transceiver is not capable of transmitting the local status detecting means 405 will not be supplied with an appropriate status signal. If the local facsimile transceiver is then erroneously selected to transmit, local status detecting means 405 senses the absence of an appropriate local facsimile status signal and does not supply local facsimile enable means 406 with an activating signal. If an operator erroneously selects the local facsimile transceiver to both receive and transmit facsimile information, local status detecting means 405 will supply local facsimile enable means 406 with an activating signal only if the local facsimile transceiver admits of its transmit mode. In addition, the local status detecting means 405 will generate an audio alarm signal to indicate an erroneous manual operation.

Transmit enable means 402 generates an a.c. signal of a predetermined frequency which signal is applied to the telephone line to which a remote facsimile transceiver that has been selected to transmit is coupled. Suitable switch means that is operated simultaneously with the manual operation of transmit station selecting means 203 supplies the enabling signal from transmit enable means 402 to the appropriate telephone line. In light of the aforedescribed operation of local facsimile enable means 406, it is clear that the enabling signal generated by transmit enable means 402 need not be applied to the local facsimile transceiver. Accordingly, the operation of transmit enable means 402 is inhibited when the local facsimile transceiver is selected to transmit. Hence, transmit enable means 402 is provided with a second inhibit input terminal to which is supplied the generated signal identifying the local facsimile transceiver as the facsimile transceiver selected to transmit. Alternatively, the switch means coupled to the output terminal of transmit enable means 402 may include contacts coupled only to the telephone lines to which the remote facsimile transceivers are coupled. Consequently, transmit enable means 402 will not be provided with a transmission path from the output terminal thereof to the local facsimile transceiver. Hence, when the local facsimile transceiver is selected to receive the enabling signal generated by transmit enable means 402 will not be supplied thereto.

The operation of transmit station selecting means 203 taken with the operation of status detecting means 301 and enable selected receive means 302 as well as local status detecting means 405 and local facsimile enable means 406 establishes communication channels between the facsimile transceiver selected to transmit and the one or more facsimile transceivers selected to receive. Facsimile information may now be transmitted over the established communication channels. It is recalled that facsimile information is transmitted to those facsimile transceivers selected to receive by data signal transmit means 201. In addition, the transmitted facsimile information is coupled from data signal transmit means 201 to data detecting means 401. As has been noted hereinabove, data detecting means 401 includes suitable circuitry soon to be described, that detects signals that are characteristic of a facsimile transmission. In a facsimile transmission system, facsimile information is conveyed in the well-known manner by transmitting black, white and gray signals. In a system wherein the present invention may be utilized it is contemplated that a white signal is transmitted only during a facsimile transmission. Accordingly, data detecting means 401 may, for example, include a white signal detector, such as a filtering device sharply tuned to the frequency of a white signal or a threshold detector responsive to the amplitude of a white signal.

During a facsimile transmission, data detecting means 401 applies a signal to the first inhibit input terminal of transmit enable means 402 to terminate the generation of an enabling signal. In addition, data detecting means 401 responds to the detected facsimile transmission to supply end of message detecting means 403 with a data detect signal. End of message detecting means 403 is responsive to the termination of a data detect signal to produce suitable indicating signals that are supplied to indicating means 404. Thus, when a facsimile transmission is completed, the data detect signal produced by data detecting means 401 is terminated. Accordingly, end of message detecting means 403 generates an end of message audio signal and an end of message illuminating signal. Indicating means 404 may include a suitable visual indicating means, such as a lamp similar to the lamp described with respect to EOM reset switch 24, that admits of a constant illumination upon the completion of a facsimile transmission. In addition, an audio indicator may be provided to produce a characteristic tone in response to the end of message audio signal. It is appreciated therefore that suitable indications are provided upon the completion of a facsimile transmission. End of message detecting means 403 may be reset to its initial condition upon the manual operation of an appropriate switch means such as EOM reset switch 24. The response of data detecting means 401 to a completed facsimile transmission may be utilized to generate an appropriate "Clear" signal that is applied to status detecting means 301 and to local status detecting means 405 to reset the respective status detecting means to their initial conditions. The output terminal of data detecting means 401 may therefore be coupled to a suitable timing means such that the "Clear" signal is generated at a predetermined time subsequent to the completion of a facsimile transmission. Data detecting means 401 and end of message detecting means 403 will be described in greater detail hereinbelow with reference to FIG. 7.

Figure 5:
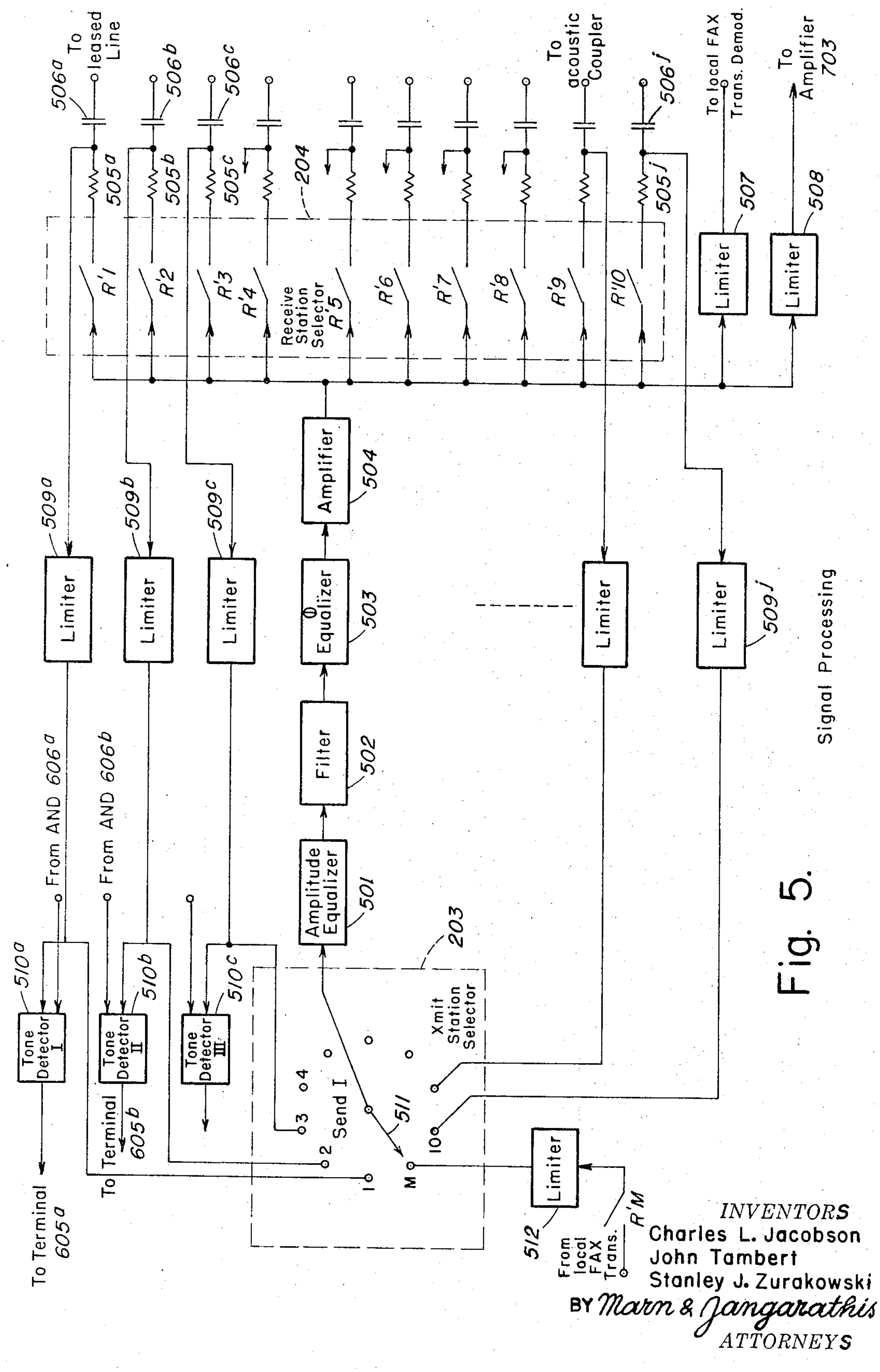
FIG. 5 represents in partial schematic and partial block form some of the blocks illustrated in FIG. 2.

Data signal transmit means 201, data signal receive means 202, transmit station selecting means 203 and receive station selecting means 204 are shown in more detail in the partial block and the partial schematic diagram of FIG. 5. Data signal transmit means 201 is comprised of amplitude equalizing means 501, filter means 502, phase equalizing means 503 and amplifying means 504. Amplitude equalizing means 501 is adapted to adjust the amplitude of a signal supplied thereto whereby the supplied signal is made compatible with the particular communication channel to which it is ultimately applied. In the preferred utilization of the present invention, facsimile information is transmitted over telephone lines. The amplitude varying characteristics of a telephone line vary in a non-linear manner with respect to the frequency of a signal transmitted thereover. Accordingly, amplitude equalizing means 501 is adapted to compensate the amplitude of the signal supplied thereto whereby a signal is obtained having an amplitude that is sufficient for transmission over a telephone line. Hence, amplitude equalizing means 501 may comprise a variable gain amplifier having an amplification factor that is complementary with the attenuating characteristics of the telephone lines. It should be understood that the non-linear amplification factor may be greater or less than unity.

Amplitude equalizing means 501 is coupled to filter means 502, the latter being adapted to remove unwanted frequencies from the signals supplied thereto. It will soon be seen that the signal provided at the input terminal of amplitude equalizing means 501 exhibits a substantially rectangular waveform and therefore is comprised of the odd harmonics of a fundamental sinusoid. The frequency characteristics of a telephone line result in undesirable distortion of the higher harmonics whereby adequate data transmission cannot obtain. Moreover, public telephone operating companies prohibit the transmission of higher harmonics over the facilities thereof. Accordingly, filter means 502 is capable of removing the harmonic frequencies of a fundamental sinusoid such that phase equalizing means 503 is supplied with a signal that exhibits a sinusoidal waveform compatible with the telephone lines. A further undesireable feature of conventional telephone lines is the inherent phase distorting characteristics thereof. The phase distortion of a telephone line varies in a nonlinear manner with respect to the frequency of a signal transmitted thereover. Phase equalizing means 503 is adapted to compensate for the non-linear phase distorting characteristics by adding a compensating nonlinear distortion to the signals supplied thereto by filter means 502. Thus, the signals transmitted over the telephone lines will be subjected to a linear phase shift characteristic irrespective of the frequencies thereof. Deleterious effects attributed to the distortion characteristics of the telephone lines are thereby mitigated. Phase equalizing means 503 may, therefore, comprise a conventional variable phase shift circuit well known in the prior art. Amplifying means 504 is coupled to phase equalizing means 503 at an input terminal thereof and is coupled to receive station selecting means 204 at an output terminal thereof. Amplifying means 504 is adapted to provide a final adjustment in the amplitude of the signal to be tranmitted over the telephone line, Accordingly, if the signal provided at the output terminal of phase equalizing means 503 admits of sufficient amplitude, amplifying means 504 may be omitted.

Receive station selecting means 204 is adapted to selectively supply the signals provided at the output terminal of amplifying means 504 to those telephone lines coupled to remote facsimile transceivers selected to receive. Accordingly, receive station selecting means 204 may comprise a plurality of activatable switch means R'1–R'10 each of which is associated with a corresponding one of the telephone lines. The activatable switch means may comprise conventional relay contact, transistor switch means, or the like. The input terminals of the activatable switch means R'1–R'10 are connected in common relation to the output terminal of amplifier means 504. The output terminal of each activatable switch means is a.c. coupled to a corresponding telephone line by the circuit comprised of series connected resistance means 505, adapted to limit the amplitude of the signals transmitted over the telephone line in accordance with the requirements of the public telephone operating companies, and capacitance means 506. In the embodiment illustrated herein, the output terminal of each activatable switch means R'1 . . . R'8 is coupled to a leased telephone line by series connected resistance means 505*a* . . . 505*h* and capacitance means 506*a* . . . 506*h*, respectively. It is understood that suitable coupling means such as that described in aforementioned U.S. Pat. application Ser. No. 165,455 may be interposed between each of the capacitance means 506*a* . . . 506*h* and a corresponding leased telephone line. Activatable switch means R'9 and R'10 are a.c. coupled to corresponding acoustic coupling means by series connected resistance means 505*i* and 505*j* and capacitance means 506*i* and 506*j*. It is understood that although FIG. 5 illustrates receive station selecting means 204 as being comprised of 10 activatable switch means, it should be clearly understood that any convenient number of activatable switch means may be utilized in accordance with the number of remote facsimile transceivers that are employed. In addition, the output terminal of each activatable switch means may be coupled to a leased telephone line or to an acoustically coupled telephone line if so desired. For purposes of explanation, however, it will be assumed that activatable switch means R'9 and R'10 are dedicated for use with acoustically coupled telephone lines.

The output terminal of amplifying means 504 is additionally coupled to the common connected input terminals of limiter means 507 and 508. Each of limiter means 507 and 508 may be comprised of conventional limiting devices adapted to convert a signal admitting of sinusoidal characteristics to a signal admitting of rectangular wave shape. Such devices are well known in the prior art and need not be further described. The output terminal of limiter means 507 is coupled to the demodulator of the local facsimile transceiver. The output terminal of limiter means 508 is coupled to amplifier means 703 included in the data detecting means illustrated in more detail in FIG. 7.

The data signal receive means 202 of FIG. 2 is comprised of a plurality of limiter means 509*a* . . . 509*j*. The input terminal of each limiter means is coupled to a corresponding junction formed by the series connection of resistance means 505*a* . . . 505*j* and capacitance means 506*a* . . . 506*j*. Accordingly, limiter means 509*a* is coupled to the junction formed by resistance means 505*a* and capacitance means 506*a*. Similarly, limiter means 509*b* is coupled to the junction formed by resistance means 505*b* and capacitance means 506*b*. The remaining limiter means are similarly connected such that limiter means 509*j* is coupled to the junction formed by resistance means 505*j* and capacitance means 506*j*. Consequently, each limiter means 509*a* . . . 509*j* is a.c. coupled to an associated telephone line. The limiter means 509*a* . . . 509*j* are similar to aforedescribed limiter means 507 and are adapted to convert a signal admitting of sinusoidal characteristics to a signal admitting of rectangular wave shape. The output terminal of each of limiter means 509*a* . . . 509*j* is coupled to transmit station selecting means 203. In addition, those limiter means associated with leased telephone lines are further coupled to respective tone detecting means 510. Hence, the output terminal of limiter means 509*a* is additionally coupled to tone detecting means 510*a*, and so on. Each of tone detecting means 510*a* . . . is adapted to detect an a.c. signal admitting of a predetermined frequency. Accordingly, the tone detecting means may comprise sharply tuned band-pass filter means. The output terminals of the tone detecting means 510*a* . . . are coupled to the logic circuit further illustrated in FIG. 6. It should be noted that those limiter means associated with acoustically coupled telephone lines are not further coupled to corresponding tone detecting means.

Transmit station selecting means 203 is illustrated as comprising a selective switching device such as a rotary switch identified as SEND I. The rotary switching device includes a plurality of stationary contacts each being coupled to a respective one of limiter means 509*a* . . . 509*j*, and a movable contact 511 coupled to the input terminal of amplitude equalizing means 501. The rotary switching device also includes an additional stationary contact "M" that is coupled to the local facsimile transceiver through limiter means 512 and activatable switch means R'M. It will soon be seen that the rotary switching device may include a plurality of decks each including corresponding stationary contacts and a movable contact. Alternatively, the transmit station selecting means 203 may comprise a plurality of switch means similar to those illustrated as activatable switch means R'1–R'10 having output terminals connected in common relationship with the input terminal of amplitude equalizing means 501 and input terminals connected to corresponding ones of limiter means 509*a* . . . 509*j* and 512. Accordingly, transmit station selecting means 203 may comprise a plurality of single pole single throw switches, a plurality of push button switches, or the like. It is noted that in the illustrated embodiment, the particular positioning of movable contact 511 is adapted for manual operation.

Activatable switch means R'M is similar to the aforedescribed activatable switch means R'1–R'10 and may therefore comprise conventional relay contacts, a transistor switch means, or the like. Activatable switch means R'M is adapted to be closed in response to the activation thereof whereby the local facsimile transceiver is coupled to limiter means 512. Limiter means 512 is similar to aforedescribed limiter means 507 and need not be further described.

The operation of the electrical apparatus diagramatically represented in FIG. 5 will now be described. Movable contact 511 of the rotary switching device SEND I is manually positioned at a desired one of the illustrated stationary contacts to thereby complete an electrical circuit from one of the limiter means 509*a* . . . 509*j*, 512 to amplitude equalizing means 501. Since the limiter means 509*a* . . . associated with the leased telephone lines are in direct communication with respective remote facsimile transceivers, it is manifest that signals transmitted by said remote facsimile transceiver traverse the associated leased telephone lines and are applied to the limiter means 509*a* . . . via capacitance means 506*a* . . . Signals received by the one limiter means electrically connected to amplitude equalizing means 501 by switching device SEND I are applied to the amplitude equalizing means. It is seen that the signals received by limiter means 509*a* . . . from the corresponding remote facsimile transceivers coupled to the leased telephone lines are applied to respective tone detecting means 510*a* . . . Thus, if any of the received signals applied to the tone detecting means admit of a predetermined frequency to which the tone detecting means are tuned, an output signal is produced. A signal admitting of the predetermined frequency corresponds to the aforedescribed status signal representing the capability of the remote facsimile transceiver to receive facsimile information. Accordingly, the tone detecting means 510*a* . . . apprise the circuitry illustrated in FIG. 6 of the capability of the remote facsimile transceivers to receive. It will be seen from the forthcoming description that the output signals produced by the tone detecting means are combined with select signals generated in response to the manual operation of switches such as the switches 28–37 illustrated in FIG. 1 to produce activating signals for the activatable switch means R'1–R'10. Accordingly, one or more of the activatable switch means R'1–R'10 will be closed when one or more of the remote facsimile transceivers capable of receiving facsimile information are selected to receive. Hence, a communication channel is established between the output terminal of amplifier means 504 and each of the selected remote facsimile transceivers. Facsimile information may now be transmitted from the remote facsimile transceiver selected to transmit through the leased telephone line to a corresponding one of capacitance means 506*a* . . . 506*j*, thence to an associated limiter means 509*a* . . . 509*j*, to a stationary contact of the rotary switching device SEND I, through movable contact 511 to amplitude equalizing means 501. The amplitude of the limited facsimile information signal is equalized or compensated by amplitude equalizing means 501 and the odd harmonics of said limited facsimile information signal are removed by filter means 502. A compensating phase shift is added to the filtered signal by phase equalizing means 503 and the phase shifted signal is further amplified by amplifier means 504. The facsimile information signal thus appearing at the output terminal of amplifier means 504 is selectively supplied to leased and acoustically coupled telephone lines in accordance with the closed activatable switch means R'1–R'10. The facsimile information is thus transmitted to those remote facsimile transceivers that have been selected to receive.

Those remote facsimile transceivers that receive facsimile information will not transmit the aforedescribed status signals to the respective tone detecting means 510*a* . . . during the receiving operation. Accordingly, those tone detecting means will not produce output signals. Nevertheless, the possibility that those closed activatable switch means R'1–R'10 will be opened in the absence of such output signals is obviated by applying further signals to those tone detecting means 510*a* . . . The further signals induce the tone detecting means to produce the aforementioned output signals. The generation of these further signals is described in more detail with respect to FIG. 6.

Figure 7:
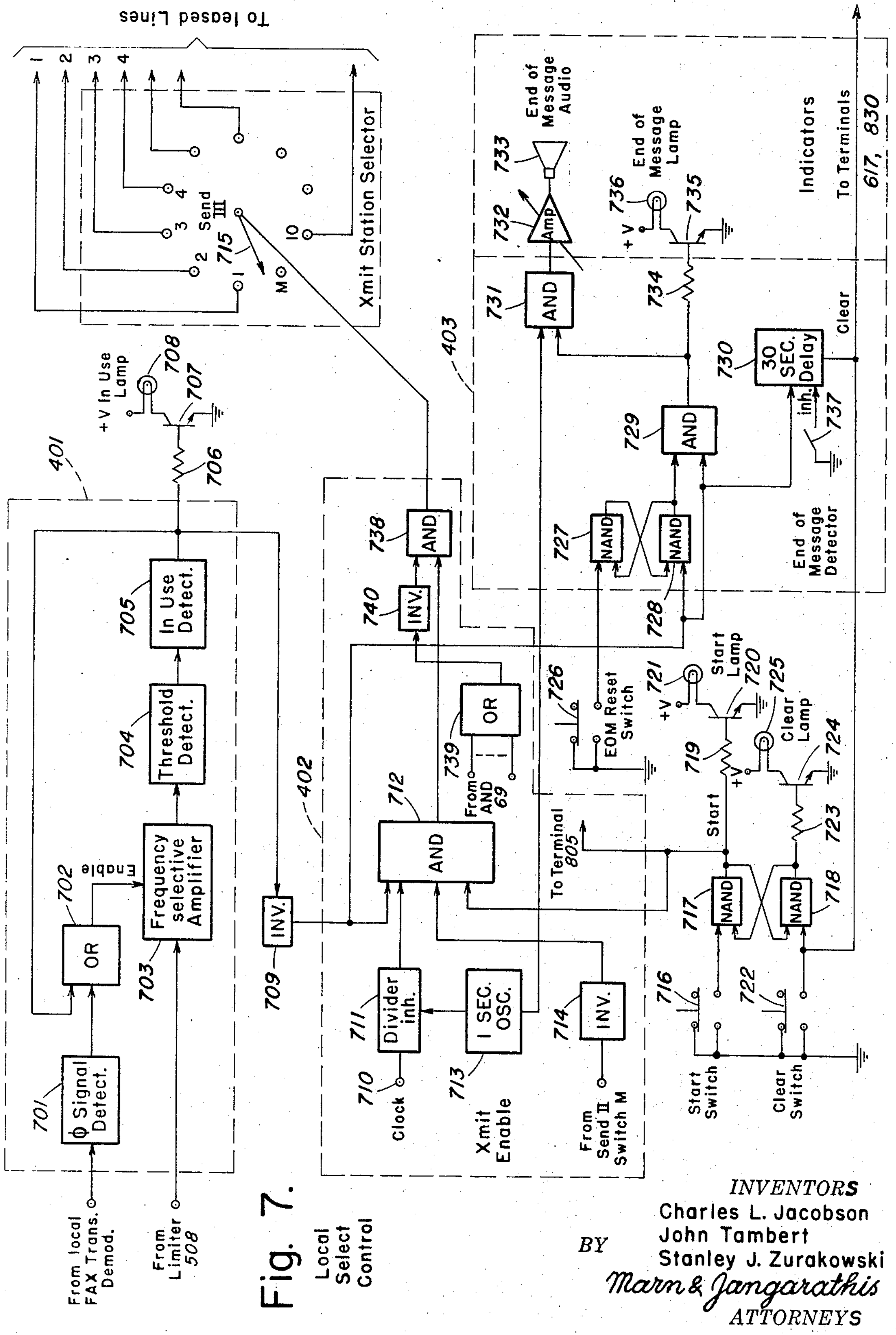
FIG. 7 is a logic circuit representing some of the blocks illustrated in FIG. 4.

The facsimile information appearing at the output terminal of amplifier means 504 is additionally applied to the local facsimile transceiver by limiter means 507 and to the data detecting means of FIG. 7 by limiter means 508. If the local facsimile transceiver has been properly selected to receive facsimile information, the facsimile information supplied thereto by limiter means 507 will be appropriately utilized. If, however, the local facsimile transceiver has not been selected to receive, the facsimile information supplied thereto will merely be demodulated by the demodulator means included therein for a purpose soon to be described. When a facsimile transmission is completed, each of the activatable switch means R'1–R'10 will assume their initial quiescent conditions as illustrated in FIG. 5. It is recalled that the initial condition is obtained in response to the generation of a "Clear" signal. The manner in which the "Clear" signal is obtained is described in detail hereinbelow.

If the movable contact 511 of the rotary switch device SEND I is positioned at stationary contact "M" activatable switch means R'M will be closed if the local facsimile transceiver admits of its transmit mode and a suitable switch means, to be described, is operated. Accordingly, facsimile information will be transmitted from the local facsimile transceiver through activatable switch means R'M, to limiter means 512, to stationary contact "M," through movable contact 511 to amplitude equalizing means 501, through filter means 502, through phase equalizing means 503, to amplifier means 504, whereat the facsimile information signals are selectively coupled to the leased or acoustically coupled telephone lines in accordance with the closed activatable switch means R'1–R'10. It is understood that upon the completion of a facsimile transmission, activatable switch means R'M will be returned to its illustrated initial condition.

It will soon be seen that when movable contact 511 is positioned at one of the stationary contacts of the rotary switch device, a corresponding one of the activatable switch means R'1–R'10 connot be closed. Accordingly, if movable contact 511 is positioned at stationary contact "1," activatable switch means R'1 cannot be closed. Similarly, if movable contact 511 is positioned at stationary contact "2," activatable switch means R'2 cannot be closed. Thus a status signal that might be transmitted by a remote facsimile transceiver cannot be re-transmitted thereto, nor can facsimile information be re-transmitted thereto.

Figure 6:
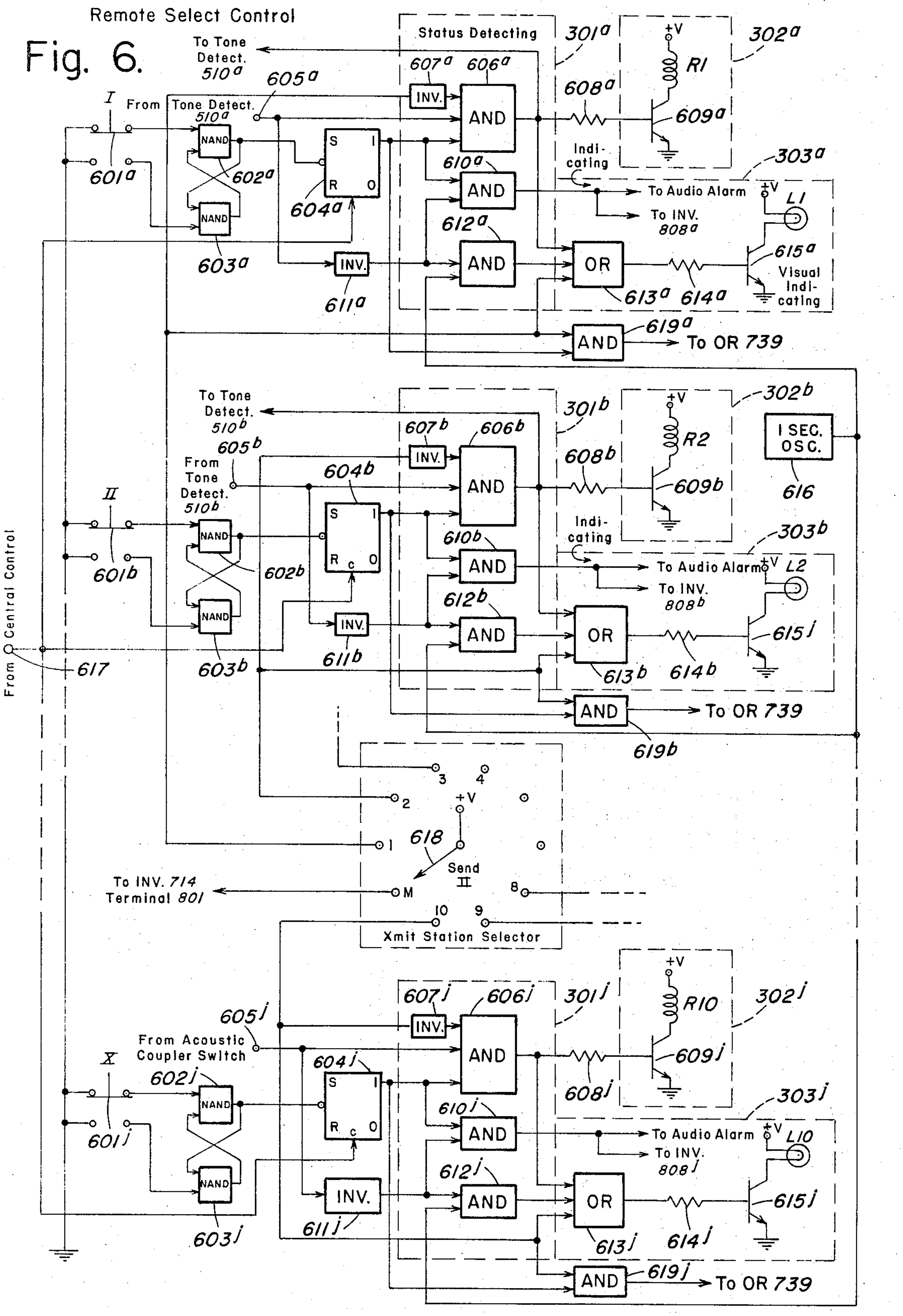
FIG. 6 is a logic circuit of the blocks illustrated in FIG. 3.

The specific circuitry comprising the block diagram illustrated in FIG. 3 is shown in detail as the logic circuit of FIG. 6. A plurality of similar circuits is provided, each being associated with a corresponding one of the remote facsimile transceivers. Accordingly, the status detecting means 301 is comprised of a plurality of respective status detecting means 301*a* . . . 301*j*, enable selected receive means 302 is comprised of a plurality of respective enable selected receive means 302*a* . . . 302*j* and indicating means 303 is comprised of a plurality of respective indicating means 303*a* . . . 303*j*. In an effort to refrain from unduly complicating the drawing, the circuits associated with only three remote facsimile transceivers are illustrated herein. Status detecting means 301*a* is utilized in controlling the selection of a remote facsimile transceiver coupled to a leased telephone line, such as remote facsimile transceiver 213*a*, to receive facsimile information and is comprised of first coincidence means 606*a*, second coincidence means 610a and third coincidence means 612*a*. A coincidence means is adapted to combine the input signals supplied thereto such that an output signal is produced upon the simultaneous application of each of the input signals. Accordingly, the coincidence means may comprise a conventional AND gate wherein a binary "1" is produced at the output terminal thereof when a binary "1" is received at each input terminal thereof. Alternatively, the coincidence means may comprise a conventional NAND gate wherein a binary "0" is produced at the output terminal thereof when a binary "1" is provided at each input terminal thereof. For purposes of explanation, it will be assumed that the coincidence means described throughout are comprised of conventional AND gates. Moreover, it is further assumed that a binary "1" is represented by a positive d.c. voltage level and a binary "0" is represented by a reference d.c. voltage level, such as ground potential, which is less than the representative magnitude of a binary "1."

Coincidence means 606*a* includes three input terminals, a first of which being coupled to an output terminal of flip-flop means 604*a* and adapted to receive a select signal produced upon the manual operation of a switch means. A second input terminal of coincidence means 606*a* is coupled to terminal 605*a* to which is applied a signal representing that the associated remote facsimile transceiver is capable of receiving facsimile information. Accordingly, terminal 605*a* may be coupled to the output terminal of tone detecting means 510*a* previously described with respect to FIG. 5. It should be apparent that if an associated remote facsimile transceiver, such as facsimile transceiver 213*a*, is capable of receiving facsimile information, tone detecting means 510*a* will apply a suitable signal to terminal 605*a*. For purposes of explanation this suitable signal is assumed to be a binary "1." The third input terminal of coincidence means 606*a* is coupled to a stationary contact of a second deck SEND II of the rotary switching device that may comprise the transmit station selecting means through inverting means 607*a*. Inverting means 607*a* is a conventional logic circuit that performs a logic negation on an input signal supplied thereto. Accordingly, if a binary "1" is applied to inverting means 607*a* a binary "0" is produced thereby. Conversely, if a binary "0" is applied to inverting means 607*a* a binary "1" is produced. The output terminal of coincidence means 606*a* is coupled to the enable selected receive means 302*a* and to indicating means 303*a*. In addition, the output terminal of coincidence means 606*a* is coupled to an appropriate input terminal of tone detecting means 510*a* to induce the tone detecting means to produce an output signal for the purpose previously described with respect to FIG. 5. It will be seen that, if desired, the output terminal of coincidence means 606*a* may be coupled to terminal 605*a* to produce the same effect.

Coincidence means 610*a* includes a first input terminal connected in common relationship with the first input terminal of coincidence means 606*a* to the output terminal of flip-flop means 604*a*. The second input terminal of coincidence means 610*a* is coupled to terminal 605*a* via inverting means 611*a*. The inverting means 611*a* is similar to aforedescribed inverting means 607*a* and need not be further described. The coincidence means 610a is adapted to provide an output signal when the remote facsimile transceiver, such as facsimile transceiver 213*a*, is not capable of receiving facsimile information but, nevertheless, an operator has erroneously selected that facsimile transceiver to receive. The output terminal of coincidence means 610*a* is coupled to a suitable audio alarm circuit, such as an audible tone generator, capable of apprising an operator of an erroneous manual operation. The output terminal of coincidence means 610*a* is additionally coupled to an inverting means further described with respect to FIG. 8.

The inverting means 611*a* is additionally coupled to an input terminal of coincidence means 612*a*. A second input terminal of coincidence means 612*a* is coupled to oscillating means 616. The oscillating means 616 is adapted to produce a periodic signal having a predetermined pulse duration. It will be seen that the periodic signal produced by oscillating means 616 is utilized in producing a pulsating illumination of a visual indicating means such as a lamp. The output terminal of coincidence means 612*a* is coupled to the indicating means 303*a*.

Flip-flop means 604*a* is a conventional toggle pulse controlled flip-flop circuit such as a J-K flip-flop, having a trigger input terminal and a clear input terminal. The binary state assumed by flip-flop means 604*a* is adapted to be changed when a signal exhibiting a negative transition is applied to the trigger input terminal. Thus, if flip-flop means 604*a* admits of its 0 state then a pulse signal, intrinsically including a negative transition, applied to the trigger input terminal thereof will trigger the flipflop means 604*a* into its 1 state. Conversely, if flip-flop means 604*a* admits of its 1 state, a pulse signal applied to the trigger input terminal thereof triggers the flip-flop means to its 0 state. It is understood that when flip-flop means 604*a* admits of its 0 state a binary "0" is provided at the 1 output terminal thereof and when the flip-flop means admits of its 1 state a binary "1" signal is provided at the 1 output terminal. The clear input terminal of flip-flop means 604a is coupled to terminal 617 and is adapted to respond to a "Clear" signal supplied thereto. For purposes of explanation it will be assumed that the applied clear signal is a binary "0," and the application of a binary "0" to the clear input terminal of flip-flop means 604*a* causes the flip-flop means to assume its 0 state. It is here noted that the initial quiescent state exhibited by flip-flop means 604a corresponds to its 0 state.

The trigger input terminal of flip-flop means 604*a* is coupled to a flip-flop circuit comprised of cross connected NAND gates 602*a* and 603*a*. It is recognized that a NAND gate is capable of producing a binary "1" at the output terminal thereof when a binary "0" is applied to any one of the input terminals thereof, and a binary "0" is produced at the output terminal when a binary "1" is applied to each of the input terminals. The flip-flop circuit comprised of NAND gates 602*a* and 603*a* is adapted to produce a binary "1" at the output terminal of NAND gate 602*a* in response to a binary "0" supplied to the input terminal thereof and to produce a binary "0" at the output terminal of NAND gate 602*a* in response to a binary "0" supplied to the input terminal of NAND gate 603*a*. Accordingly, an input terminal of each of NAND gates 602*a* and 603*a* is coupled to a respective terminal of two-position switch means 601*a*. Switch means 601*a* may comprise a conventional spring loaded push-button switch having two pairs of contacts, a relay holding switch, a single pole single throw switch, or the like. An electrical connection is established between one pair of contacts when the illustrated push-button switch admits of a first position and an electrical connection is established between the second pair of contacts when the push-button switch admits of a second position. One contact of each pair of contacts is connected in common relationship to a reference potential such as ground potential.

Enable selected receive means 302*a* is adapted to activate the activatable switch means R'1 in response to the output signal produced by coincidence means 606*a*. Accordingly, enable selected receive means 302*a* includes a conventional transistor means 609*a* and a relay energizing coil R1. Transistor means 609*a* may be a conventional NPN, PNP, or FET transistor having a control electrode, such as the base electrode thereof, coupled to the output terminal of coincidence means 606*a* via current limiting resistance means 608*a*. The output terminals of the transistor means 609*a* are connected in series relationship with relay energizing coil R1 and ground potential. A source of energizing potential +V is connected to relay energizing coil R1. Hence, a series circuit is formed between the source of energizing potential +V, relay energizing coil R1, transistor means 609*a* and ground potential. The transistor means 609*a* acts as a switching device to selectively connect a terminal of the relay energizing coil R1 to ground potential. Accordingly, transistor means 609*a* may be replaced by other conventional controlled switch means. Relay energizing coil R1 may comprise a conventional relay coil adapted to close an associated relay switch in response to a current flowing therethrough.

Indicating means 303*a* includes a visual indicating device such as a lamp L1 and a control circuit therefor such as OR circuit 613*a*. The indicating means may, in addition, include an audible tone generator previously described. It is preferred, however, that a central audible tone generator be provided which may be activated by any of the coincidence means 610*a* . . . 610*j*. OR circuit 613*a* is a conventional logic circuit well known to those of ordinary skill in the art that is adapted to produce a binary "1" at the output terminal thereof when any one or more of the input terminals thereof are supplied with a binary "1." Alternatively, the control circuit may be comprised of a NOR circuit wherein a binary "1" is produced at the output terminal thereof in response to a binary "0" applied to one or more of the input terminals thereof. A first input terminal of OR circuit 613*a* is coupled to the output terminal of coincidence means 606*a* and a second input terminal of the OR circuit is coupled to the output terminal of coincidence means 612*a*. A third input terminal of OR circuit 613*a* is coupled to a corresponding one of the stationary contacts included in the second deck of the rotary switching device SEND II that may comprise the transmit station selecting means. The output terminal of OR circuit 613*a* is coupled to a switch means via resistance means 614*a*. The switch may comprise any conventional controllable switching device and in the illustrated embodiment is comprised of transistor means 615*a*. The output terminals of transistor means 615*a* are connected in series relationship with lamp L1, which is connected to a source of energizing potential +V, and ground potential. The base or control electrode of the transistor means is connected to the resistance means 614*a* which may comprise a current limiting resistor.

Each of the remaining circuits associated with remaining ones of the respective remote facsimile transceivers are comprised of identical components to that described hereinabove which are connected in an identical manner. Accordingly, further description of the remaining circuitry illustrated in FIG. 6 would be merely superfluous and, therefore, is omitted. It should be noted however that the circuit illustrated in the lower portion of the drawing is associated with a facsimile transceiver that is acoustically coupled to a telephone line, such as facsimile transceiver 213*j*. Accordingly, the tone detecting means is not provided for use with this circuit. Terminal 605*j* is however, connected to an acoustic coupler switch and is provided with a binary "1" when said acoustic coupler switch is closed. It is apparent that the closing of the acoustic coupler switch is equivalent to a status signal representing that the remote facsimile transceiver is capable of receiving facsimile information.

FIG. 6 illustrates that the transmit station selecting means may include a second deck SEND II that is similar to and adapted for simultaneous operation with the first deck SEND I. Accordingly, the second deck may comprise a rotary switching device having a plurality of stationary contacts associated with each of the facsimile transceivers and a movable contact 618. The movable contact is coupled to a source of energizing potential +V which is then supplied to the stationary contact at which the movable contact 618 is positioned. FIG. 6 further illustrates a plurality of coincidence means 619*a* . . . 619*j*, each including a first terminal coupled to a corresponding stationary contact included in the second deck SEND II, and a second input terminal coupled to the 1 output terminal of flip-flop means 604*a* . . . 604*j*.

The operation of the apparatus illustrated in FIG. 6 will now be described. For purposes of simplification, the following description shall refer only to the circuit illustrated in the upper portion of the diagram, it being clearly understood that each of the remaining circuits operates in an identical manner. It is recalled that if the remote facsimile transcever 213*a* is capable of receiving facsimile information, an a.c. signal admitting of a predetermined frequency will be detected by tone detecting means 510*a*. Upon detecting this signal, which has been previously referred to as the status signal, tone detecting means 510*a* applies a binary "1" to terminal 605*a* and, therefore, a binary "1" is applied to the second input terminal of coincidence means 606*a* and to inverter means 611*a*. The logic negation performed by inverter means 611*a* on the binary "1" supplied thereto results in the application of a binary "0" to the first input terminal of coincidence means 612*a*. It is understood therefore, that coincidence means 612*a* applies a binary "0" to OR circuit 613*a*.

It is observed that in its present position, switch means 601*a* applies the reference potential, corresponding to a binary "0," to an input terminal of NAND gate 602*a*. Accordingly, a binary "1" is applied to the trigger input terminal of flip-flop means 604*a* by the NAND gate 602*a*. If now, an operator desires to select remote facsimile transceiver 213*a* to receive facsimile information, switch means 601*a* is depressed such that the reference potential, corresponding to a binary "0" is now applied to an input terminal of NAND gate 603*a*. The manual operation of switch means 601*a* serves to remove the binary "0" applied to the input terminal of NAND gate 602*a* such that the NAND gate now produces a binary "0" at the output terminal thereof. Since switch means 601*a* has been assumed to comprise a spring loaded push button switch, the release of the switch means by an operator results in a return of the switch means to the illustrated position. Hence, a binary "0" is again applied to the input terminal of NAND gate 602*a* and the binary "0" previously applied to the input terminal of NAND gate 603*a* is removed therefrom. Hence, NAND gate 602*a* again supplies the trigger input terminal of flip-flop means 604*a* with a binary "1." It is recognized that the foregoing manual operation is effective to supply the trigger input terminal of flip-flop means 604*a* with a pulse signal admitting of an intrinsic negative transition. Hence, flip-flop means 604*a* assumes its 1 output state and a binary "1" is applied to the first input terminal of coincidence means 606*a*. One of ordinary skill in the art will recognize that various other equivalent devices may be utilized to apply a binary "1" to the first input terminal of coincidence means 606*a* upon the manual operation of a switch means. For example, a single pole double throw switch or a conventional relay holding switch may be coupled to the set and reset input terminals of a flip-flop circuit having a 1 output terminal coupled to the first input terminal of coincidence means 606*a*. Thus, manual operation of the single pole double throw switch to a first position tends to set the flip-flop circuit to its 1 state whereas manual operation of the switch to its second position tends to reset the flip-flop circuit to its 0 state. The use of a spring loaded two position push button switch may however, be accompanied by unwanted "bounce" of the movable portion thereof, thereby producing pulse signals corresponding to the "bounces." The flip-flop circuit comprised of NAND gates 602*a* and 603*a* are provided to inhibit the effect of these unwanted pulse signals upon the flip-flop means 604*a*. Hence, once the switch means 601*a* is operated to produce a binary "0" followed by a binary "1" at the output terminal of NAND gate 602*a*, subsequent pulses produced by the "bouncing" of the movable portion of the switch means will not affect the binary "1" appearing at the output terminal of the NAND gate 602*a* unless the switch means is completely depressed to apply a binary "0" to the input terminal of NAND gate 603*a*. Thus, the first manual operation of switch means 601*a* applies a first pulse signal to the trigger input terminal of flip-flop means 604*a* whereby the flip-flop means assumes its 1 output state. A second manual operation of the switch means 601*a* applies a second pulse signal to the trigger input terminal of flip-flop means 604*a* whereby the flip-flop means assumes its 0 output state.

At this time, if switch means 601*a* has been manually operated, a binary "1" is applied to each of the first and second input terminals of coincidence means 606*a*. If the transmit station selecting means has been manually operated such that movable contact 618 is set to any position other than position "1," then the stationary contact at position "1" is not supplied with energizing potential. Accordingly, the stationary contact at position "1" is effective to supply a binary "0" to the input terminal of inverting means 607*a* which, in turn, applies a binary "1" to the third input terminal of coincidence means 606*a*. Accordingly, coincidence means 606*a* responds to the binary "1" applied to each input terminal thereof to produce a binary "1" at its output terminal. The produced binary "1" is applied to the base electrode of transistor means 609*a* whereat it is effective to activate the transistor means 609*a* into its conducting state. Hence, a series circuit now exists from the source of energizing potential +V through the relay energizing coil R1 through the collector-emitter junction of transistor means 609*a* to ground. Consequently, current flows through the relay energizing coil R1 and the relay contact R'1 is closed. Thus, a communication channel is established from the output terminal of amplifier means 504 through the closed contact R'1 to the remote facsimile transceiver 213*a*. The binary "1" produced by coincidence means 606*a* is applied to the base electrode of transistor means 615*a* by OR circuit 613*a*. Hence, the transistor means 615*a* is activated into its conducting state to complete a series circuit from the source of energizing potential +V, through lamp L1, through the collector-emitter junction of transistor means 615*a* to ground. Accordingly, lamp L1 admits of a constant illumination in accordance with the binary "1" produced by coincidence means 606*a*. Facsimile information may now be communicated to the remote facsimile transceiver 213*a*. Receipt of facsimile information by the remote facsimile transceiver results in the termination of a status signal transmitted thereby. However, the binary "1" produced by coincidence means 606*a* and applied to tone detecting means 510*a*, or alternatively applied directly to terminal 605*a* simulates a status signal. Accordingly, a binary "1" is maintained at terminal 605*a* during a facsimile transmission. Upon completion of the facsimile transmission, a binary "0" is applied to terminal 617 whereupon the binary "0" is supplied to the clear input terminal of flip-flop means 604*a*. Hence, flip-flop means 604*a* is reset to its initial quiescent condition and a binary "0" is applied to the first input terminal of coincidence means 606*a* by the 1 output terminal of flip-flop means 604*a*. The illustrated circuit is thus prepared for a subsequent manual operation.

The status detecting means illustrated herein is adapted to prevent the closing of activatable switch means R'1 if movable contact 618 is set to position "1". It is appreciated that if switch means 601*a* is manually operated and if remote facsimile transceiver 213*a* is capable of receiving facsimile information, a binary "1" is applied to the first input terminal of coincidence means 606*a* by flip-flop mans 604*a* and a binary "1" is applied to the second input terminal of coincidence means 606*a* by terminal 605*a*. However, if the transmit station selecting means is manually operated such that movable contact 618 is positioned at the stationary contact position "1," an electrical connection is obtained from the source of energizing potential +V, through movable contact 618, through stationary contact position "1," to the input terminal of inverting means 607*a*. The application of energizing potential to inverting means 607*a* corresponds to the application of a binary "1" to the input terminal thereof. The logic negation performed by inverting means 607*a* applies a binary "0" to the third input terminal of coincidence means 606*a*. Accordingly, coincidence means 606*a* applies a binary "0" to the base electrode of transistor means 609*a* and to OR circuit 613*a*. Consequently, transistor means 609*a* admits of its non-conducting state and energizing current does not flow through the relay energizing coil R1. Hence, activatable switch means R'1 is not closed. It is observed, therefore, that the illustrated apparatus is effective to inhibit the simultaneous selection of facsimile transceiver 213*a* to both receive facsimile information and to transmit facsimile information. Moreover, coincidence means 619*a* produces a binary "1" in response to the binary "1" supplied by stationary contact position "1" and the binary "1" applied by flip-flop means 604*a*.

The binary "1" supplied by the stationary contact at position "1" when movable contact 618 is positioned thereat is applied to an input terminal of OR circuit 613*a* which, in turn, applies the binary "1" to the base electrode of transistor means 615*a*. The transistor means 615*a* is therefore activated into its conducting state such that current flows from the source of energizing potential +V, through lamp L1, through the collector-emitter junction of transistor means 615*a* to ground potential to produce a constant illumination of the lamp. It is appreciated, therefore, that lamp L1 exhibits a constant illumination when facsimile transceiver 213*a* is selected to transmit facsimile information or is properly selected to receive facsimile information.

In the event that facsimile transceiver 213*a* is not capable of receiving facsimile information it is appreciated that a status signal is not applied to tone detecting means 510*a*. Consequently, a binary "0" is applied to terminal 605*a* by tone detecting means 510*a*. The binary "0" is applied to the second input terminal of coincidence means 606*a* thereby inhibiting the generation of a binary "1" at the output terminal thereof. In addition, the binary "0" is supplied to inverting means 611*a* which performs the inverting operation to apply a binary "1" to the respective input terminals of coincidence means 610*a* and 612*a*. The periodic signal generated by oscillating means 616 is applied to a second input of coincidence means 612*a* such that a corresponding periodic signal is produced at the output terminal thereof. Hence, coincidence means 612*a* supplies OR circuit 613*a* with alternating binary 1's and binary 0's, each having a duration that corresponds to the periodic signal generated by oscillating means 616. The alternating binary 1's and binary 0's are supplied to the base electrode of transistor means 615*a* by OR circuit 613*a* to periodically activate the transistor means into its conducting and non-conducting states, respectively. It is appreciated, therefore, that a pulsating current is caused to flow through lamp L1 resulting in a pulsating illumination thereof. Consequently, the inability of remote facsimile transceiver 213*a* to effectively receive facsimile information is indicated by a flashing of lamp L1. It is of course recognized that, if the remote facsimile transceiver subsequently admits of a receiving mode of operation, tone detecting means 510*a* receives a status signal to thereby apply a binary "1" to terminal 605*a*. Accordingly, inverting means 611*a* will therefore supply a binary "0" to the first input terminal of coincidence means 612*a* such that the coincidence means 612*a* applies a binary "0" to OR circuit 613*a* thereby extinguishing the illumination of lamp L1.

Returning now to the example wherein remote facsimile transceiver 213*a* is not capable of receiving facsimile information and a binary "0" is applied to terminal 605*a*; if switch means 601*a* is manually operated to produce a pulse at the output terminal of NAND gate 602*a*, a binary "1" is applied by flip-flop means 604*a* to the first input terminal of coincidence means 606*a*. It is observed that the binary "0" applied to terminal 605*a* is effective to inhibit coincidence means 606*a* from responding to the binary "1" supplied by flip-flop means 604*a*. Hence, transistor means 609*a* remains in its non-conducting state and current does not flow through relay energizing coil R1. Accordingly, activatable switch means R'1 remains in its opened position. Nevertheless, coincidence means 610*a* is supplied with a binary "1" at its first input terminal by flip-flop means 604*a* and with a binary "1" at its second input terminal by inverting means 611*a*. It is appreciated therefore, that coincidence means 610*a* produces a binary "1" at its output terminal to thereby energize an audible tone generator. The binary "1" supplied by coincidence means 610*a* corresponds to the aforedescribed audio alarm signal. The energizing of an audible tone generator serves to apprise an operator of an erroneous manual operation of coincidence means 601*a*. A subsequent manual operation of switch means 601*a* serves to produce a pulse signal at the output terminal of NAND gate 602*a* in the well-appreciated manner. The subsequently produced pulse is applied to the trigger input terminal of flip-flop means 604*a* resulting in a corresponding change in the output binary state assumed thereby. Hence, a binary "0" is supplied by flip-flop means 604*a* to the first input terminal of coincidence means 606*a* and to the first input terminal of coincidence means 610*a*. Accordingly, coincidence means 610*a* produces a binary "0" at the output terminal thereof, thereby extinguishing the audio alarm signal. It is recognized that if a binary "0" is applied to terminal 617, such as by applying a "Clear" signal thereto, the flip-flop means 604*a* would be reset to its initial quiescent 0 output state. Hence, a binary "0" is applied by flip-flop means 604*a* to coincidence means 610*a* thereby extinguishing the audio alarm signal. Alternatively, the "Clear" signal may be utilized to reset a conventional holding relay switch to its quiescent condition. The manner in which a binary "0" is applied to terminal 617 is described further hereinbelow with respect to FIG. 7.

It should now be readily apparent that switch means 601*a* . . . 601*j* correspond to switches 28–37 of FIG. 1. Also, lamps L1 . . . L10 correspond to the lamps associated with the aforedescribed switches 28–37. Accordingly, lamps L1 . . . L10 may be included in the structure of switch means 601*a* . . . 601*j*, respectively.

The foregoing description serves to particularly point out that coincidence means 606*a* operates to compare the select signal produced by the manual operation of switch means 601*a*, i.e., the binary "1" applied by flip-flop means 604*a*, with the monitored capability of remote facsimile transceiver 213*a* to receive facsimile information. The produced select signal is gated to the base electrode of transistor means 609*a* if the remote facsimile transceiver 213*a* is capable of receiving facsimile information and if the remote facsimile transceiver 213*a* has not been selected by the transmit station selecting means to transmit facsimile information. The gated select signal may be utilized in any equivalent manner other than that specifically illustrated herein to effect the closing of activatable switch means R'1. In addition, coincidence means 610*a* is capable of detecting an erroneous selection by an operator of a remote facsimile transceiver to receive and coincidence means 619*a* is capable of detecting the selection of a remote facsimile transceiver to simultaneously transmit and receive. It is further understood that the switch means SEND II is not strictly limited to the rotary switching device configuration illustrated herein. The switch means could be readily adapted for simultaneous and corresponding operation with the transmit station selecting means previously described with respect to FIG. 5. Accordingly, switch means SEND II may comprise a plurality of single pole, single throw switch means having first input terminals connected in common relationship to the source of energizing potential +V and output terminals corresponding to the respective positions "1" . . . "10," "M."

A portion of the block diagram of FIG. 4 is illustrated in more detail in FIG. 7 which comprises data detecting means 401, transmit enable means 402, end of message detecting means 403 and indicating means 404. FIG. 7 additionally illustrates various switch means previously described with respect to FIG. 1. Data detecting means 401 is comprised of phasing signal detecting means 701, frequency selective amplifying means 703, threshold detecting means 704 and detecting means 705. It is recalled that the data detecting means senses the characteristic signals transmitted during a facsimile transmission. These characteristic signals correspond to a facsimile signal representing white information. In a facsimile system wherein facsimile transceivers similar to the Telecopier II or Telecopier III are used, white information will be transmitted by an a.c. signal admitting of a predetermined frequency, hereinafter a white tone. In order to distinguish between a true white tone that is transmitted by a facsimile transceiver and a random signal that may be falsely detected as a white tone, the illustrated data detecting means does not respond to a received white tone unless a true facsimile transmission has been initiated. It is characteristic of the facsimile transceivers that may be utilized with the present invention that the initial signals transmitted during a true facsimile transmission are phasing signals which enable a receiving facsimile transceiver to be phase synchronized with a transmitting facsimile transceiver. More particularly, it is contemplated that the phasing signals are comprised of pulse bursts of white tone and admitting of a large duty cycle comprised of black tone. Phasing signal detecting means 701 is adapted to detect these duty cycles of black tone and therefore may comprise suitable pulse detecting and filtering means. Since the facsimile signals transmitted by a facsimile transceiver are appropriately modulated, such as by frequency, amplitude or phase modulation, the input terminal of phasing signal detecting means 701 is coupled to limiter means 507 via a suitable demodulator. In one embodiment of the present invention a typical demodulator that may be utilized is the demodulator included in the local facsimile transceiver. Hence, such demodulator may be electrically interposed between limiter means 507 and phasing signal detecting means 701. It is of course understood that phasing signal detecting means 701 may itself include a demodulator and therefore may be coupled directly to the output terminal of limiter means 507.

The output terminal of phasing signal detecting means 701 is coupled through a suitable combining means, soon to be described, to an enable input terminal of frequency selective amplifying means 703. The latter means includes an input terminal coupled to limiter means 508 and comprises a conventional amplifier having an amplification factor that is dependent upon the frequency of an applied input signal. The amplification factor of the frequency selective amplifying means 703 is such that maximum gain is applied to an input signal corresponding to the white tone. The output terminal of frequency selective amplifying means 703 is coupled to threshold detecting means 704 which may comprise a conventional threshold means such as a comparator circuit or the like. The threshold detector is adapted to determine if the amplitude of the signal supplied thereby by frequency selective amplifying means 703 exceeds a predetermined threshold or white level. Thus, threshold detecting means 704 may comprise a conventional difference amplifier adapted to produce an output signal proportional to the difference between an applied input signal and a predetermined threshold or white level. The output terminal of threshold detecting means 704 is coupled to detecting means 705 which is adapted to sense the time intervals between successive white input signals. Detecting means 705 may therefore comprise a conventional integrating circuit, storage capacitor coupled to a discharge circuit having a predetermined time constant, or the like. If the time interval between successive input signals exceeds a pre-established amount, detecting means 705 is capable of producing a binary "0" at the output terminal thereof. The output terminal of detecting means 705 is fed back to the combining means 702 which is adapted to apply an enabling signal to frequency selective amplifying means 703 in response to a detected phasing signal or to a signal produced by detecting means 705. Accordingly, the combining means 702 may comprise a circuit such as a conventional OR circuit or the like. The output terminal of detecting means 705 is additionally coupled to inverting means 709 and to the base or control electrode of transistor means 707 via current limiting resistance means 706. The output terminals of transistor means 707 are connected in series relationship with IN USE lamp 708 and with reference or ground potential. The IN USE lamp 708 is coupled to a source of energizing potential +V. Transistor means 707 is adapted to operate as a switch means to selectively connect IN USE lamp 708 to ground potential in response to the output signal produced by detecting means 705.

In operation, facsimile information is transmitted to one or more facsimile transceivers by amplifying means 504 illustrated in FIG. 5. Accordingly, upon the initiation of a facsimile transmission, modulated phasing pulses will be transmitted by amplifying means 504 to the receive station selecting means 204 and to limiter means 507. The demodulator coupled to limiter means 507, such as the demodulator included in the local facsimile transceiver, applies demodulated phasing pulses to the input terminal of phasing signal detecting means 701. The phasing pulses are detected and a signal similar to a binary "1" is applied to the enable input terminal of frequency selective amplifying means 703 by the phasing signal detecting means 701 via combining means 702. Frequency selective amplifying means 703 is now enabled to respond to white tone that may be applied thereby by limiter means 508. It is recognized therefore, that spurious signals resembling white tone will have no effect upon frequency selective amplifying means 703 in the absence of an actual facsimile transmission. The varying amplitude of the signal produced by frequency selective amplifying means 703 is compared to a constant predetermined threshold or white level by threshold detecting means 704. Although white tone is randomly transmitted during a facsimile transmission, it is expected that white tone will be transmitted at least once during the course of each document line scan. Accordingly, the time interval between successive white signals produced by threshold detecting means 704 will be no greater than the length of time necessary to scan one line of an original document. If detecting means 705 comprises a storage capacitor coupled to a discharge circuit, the storage circuit will be charged in response to each white signal produced by a threshold detecting means 704 and will be discharged during the interval between successive signals. The time constant of the discharge circuit may be specifically selected such that the storage capacitor is completely discharged if the interval between successive signals is greater than the length of time required to scan a line of the original document. Hence, a binary "1" is produced if the storage capacitor is not discharged and a binary "0" is produced if the storage capacitor is completely discharged. Alternatively, if detecting means 705 comprises an integrating circuit, a similar operation is performed and a binary "1" is produced if the interval between successively applied signals is less than a predetermined amount and a binary "0" is produced when the interval between successively applied signals exceeds said predetermined amount. Consequently, during an actual facsimile transmission a binary "1" is provided at the output terminal of detecting means 705. The binary "1" produced at the output terminal of detecting means 705 is applied by combining means 702 to the enabling input terminal of frequency selective amplifying means 703. Since the phasing signals are comprised of pulse bursts of white tone, it is apparent that the phasing signals are not only detected by phasing signal detecting means 701 but are suitably amplified by frequency selective amplifying means 703 to result in a binary "1" at the output terminal of detecting means 705. Nevertheless, when the phasing signal terminates and facsimile information is transmitted, phasing signal detecting means 701 cannot supply the combining means 702 with an appropriate signal. Thus, it is seen that the binary "1" produced by detecting means 705 is fed back to the enabling input terminal of frequency selective amplifying means 703 such that the latter means may continue its operation after the termination of the phasing signal and during the transmission of facsimile information.

The binary "1" produced by detecting means 705 is applied to the base or control electrode of transistor means 707 whereby the transistor means is activated to its conducting state. The potential across the collector-emitter junction of transistor means 707 is thus reduced whereby current flows from the source of energizing potential +V, through IN USE lamp 708, through the collector-emitter junction of transistor means 707, to ground. Consequently, IN USE lamp 708 admits of a constant illumination during the detection of a facsimile transmission. It is apparent that when a facsimile transmission is completed, threshold detecting means 704 does not produce successive white signals having intervals therebetween that are less than said predetermined amount. Consequently, detecting means 705 produces a binary "0" which is fed back to the enabling input terminal of frequency selective amplifying means 703, thereby disabling the operation of the latter means. In addition, the binary "0" is supplied to the base or control electrode transistor means 707 whereby the transistor means assumes its non-conducting state. Current no longer flows through IN USE lamp 708, thereby extinguishing the illumination thereof. It should be readily apparent that IN USE lamp 708 corresponds to aforementioned "In Use" lamp 40 of FIG. 1.

Transmit enable means 402 is illustrated as including a signal generator comprised of dividing means 711 and oscillating means 713 and coincidence means 712. The signal generator is adapted to produce pulse signals comprised of bursts of a predetermined frequency. Accordingly, the signal generator may include an input terminal 710 coupled to a conventional binary dividing means 711 having an inhibit input terminal. Binary dividing means are well known to those of ordinary skill in the prior art and serve to divide the frequency of an applied signal. Accordingly, if a constant frequency clock signal is applied to terminal 710, a lower constant frequency signal will be produced by dividing means 711. Oscillating means 713 is similar to aforedescribed oscillating means 616 and is capable of producing alternating binary 1's and binary 0's, each admitting of a predetermined duration. Oscillating means 713 is coupled to the inhibit input terminal of dividing means 711 such that the operation of the dividing means is periodically inhibited. The output of dividing means 711 is coupled to an input terminal of coincidence means 712. The coincidence means 712 is similar to aforedescribed coincidence means 606*a* and therefore may comprise a conventional AND gate. It is of course understood that, if desired, coincidence means 712 may comprise a NAND gate or the like.

A second input terminal of coincidence means 712 is coupled to the output terminal of detecting means 705 by inverting means 709. The inverting means 709 is adapted to perform a logic negation function and therefore is similar to aforedescribed inverting means 607*a*. Another input terminal of coincidence means 712 is coupled to the stationary contact position "M" of the SEND II rotary switching device illustrated in FIG. 6 via inverting means 714. The latter means is similar to inverting means 709. A further input terminal of coincidence means 712 is coupled to an output terminal of a flip-flop circuit comprised of interconnected NAND gate 717 and 718. It will soon be seen that a binary "1" is provided at the output terminal of NAND gate 717 in response to a manual operation that commences a facsimile transmission. The output terminal of coincidence means 712 is coupled via coincidence means 738 to the movable contact 715 of the third deck SEND III of the rotary switching device that may comprise the transmit station selecting means. Accordingly, switch means SEND III includes a plurality of stationary contacts having respective positions "1" – "10" and "M" corresponding to the remote facsimile transceivers 213*a* . . . 213*j* and local facsimile transceiver 212, respectively. It is observed that the switch means SEND III is similar to the aforedescribed switch means SEND I and II and is adapted for simultaneous operation therewith. The stationary contact at positions "1" – "10" are connected to corresponding ones of the leased telephone lines and to the acoustically coupled telephone lines. The stationary contact position "M" is not connected to further apparatus.

Coincidence means 738 includes an additional input terminal coupled to the output terminal of OR circuit 739 by inverting means 740. OR circuit 739 is similar to OR circuit 613*a* and includes a plurality of input terminals coupled to respective coincidence means 619*a* . . . 619*j*. OR circuit 739 is capable of detecting when any one of the remote facsimile transceivers is erroneously selected to simultaneously transmit and receive.

In operation, movable contact 715 is positioned at one of the stationary contact positions by the manual operation of the transmit station selecting means by an operator. If, for example, the remote facsimile transceiver 213*a* is selected to transmit facsimile information, movable contact 715 is positioned at the stationary contact position "1." A direct electrical connection is thus established between the output terminal of coincidence means 712, through coincidence means 738, through movable contact 715, to stationary contact position "1," to the telephone line extending to the remote facsimile transceiver 213*a*. It is recognized that identical electrical connections are established in accordance with the particular positioning of movable contact 715. Periodic bursts of pulses admitting of a predetermined frequency are applied by dividing means 711 to coincidence means 712. It is appreciated that the pulses admitting of the predetermined frequency are produced by the frequency dividing action of dividing means 711 on relatively high frequency clock pulses applied to terminal 710. The periodic bursts of pulses are produced in response to the periodic inhibiting of the operation of dividing means 711 in response to the relatively slowly alternating binary 1's and 0's applied to the inhibit terminal of dividing means 711 by oscillating means 713. It is recognized that, if desired, the periodic bursts of pulses admitting of the predetermined frequency may be generated by applying the output of dividing means 711 and the output of oscillating means 713 to respective input terminals of a coincidence means.

It is observed that inverting means 714 is supplied with a binary "1" only if the movable contact 618 of switch means SEND II is positioned at the stationary contact position "M." In all cases when a remote facsimile transceiver is selected to transmit, however, the voltage appearing at the stationary contact postion "M" of switch means SEND II is equivalent to a binary "0" and therefore a binary "0" is applied to the input terminal of inverting means 714. Accordingly, coincidence means 712 is supplied with a binary "1" by inverting means 714 when the transmit station selecting means is operated in a manner whereby a remote facsimile transceiver is selected to transmit facsimile information. In the assumed example, remote facsimile transceiver 213*a* has been selected to transmit and therefore movable contact 618 of switch means SEND II, as well as movable contact 715 of switch means SEND III, are each positioned at the stationary contact position "1." Accordingly, coincidence means 712 receives a binary "1" from inverting means 714. It is recognized that prior to the initiation of a facsimile transmission, white tone or bursts of white tone are not supplied to the data detecting means 401 and therefore a binary "0" is produced at the output terminal of detecting means 705. The binary "0" is supplied to inverting means 709 which performs a conventional logic negation function to apply a binary "1" to coincidence means 712. When a binary "1" is produced at the output terminal of NAND gate 717, it is observed that three of the input terminals of coincidence means 712 are provided with binary 1's respectively, and the fourth input terminal of coincidence means 712 is provided with bursts of pulses admitting of a predetermined frequency. Accordingly, coincidence means 712 supplies the movable contact 715 of switch means SEND III with the bursts of pulses. If OR circuit 739 receives a binary "1" from any of the coincidence means 619*a* . . . 619*j*, it is appreciated that inverting means inhibits the transmission of the bursts of pulses by supplying coincidence means 738 with a binary "0." It is recognized that the requisite bursts of pulses may be applied to the movable contact 715 if coincidence means 712 includes an input terminal coupled to a pulse generator tuned to the predetermined frequency such as an astable multivibrator, and another input terminal coupled to oscillating means 713. It is understood that various other devices may be utilized to produce the bursts of pulses that are supplied to coincidence means 712 by dividing means 711. The bursts of pulses are transmitted as an enabling signal from coincidence means 712, to movable contact 715, to the stationary contact position "1," through the telephone line, to remote facsimile transceiver 213*a*. Receipt of the enabling signal causes the remote facsimile transceiver 213*a* to commence a facsimile transmission, whereupon a binary "1" is produced at the output terminal of detecting means 705. Consequently, inverting means 709 applies a binary "0" to an input terminal of coincidence means 712 thereby inhibiting the further transmission of an enabling signal to the remote facsimile transceiver. It is readily apparent that the enabling signal produced at the output terminal of coincidence means 712 is not limited to the bursts of pulses just described and may comprise any suitable signal capable of initiating a facsimile transmission. Hence the combinarion of dividing means 711 and oscillating means 713 may be replaced by other suitable generating means adapted to generate the particular enabling signal.

Figure 8:
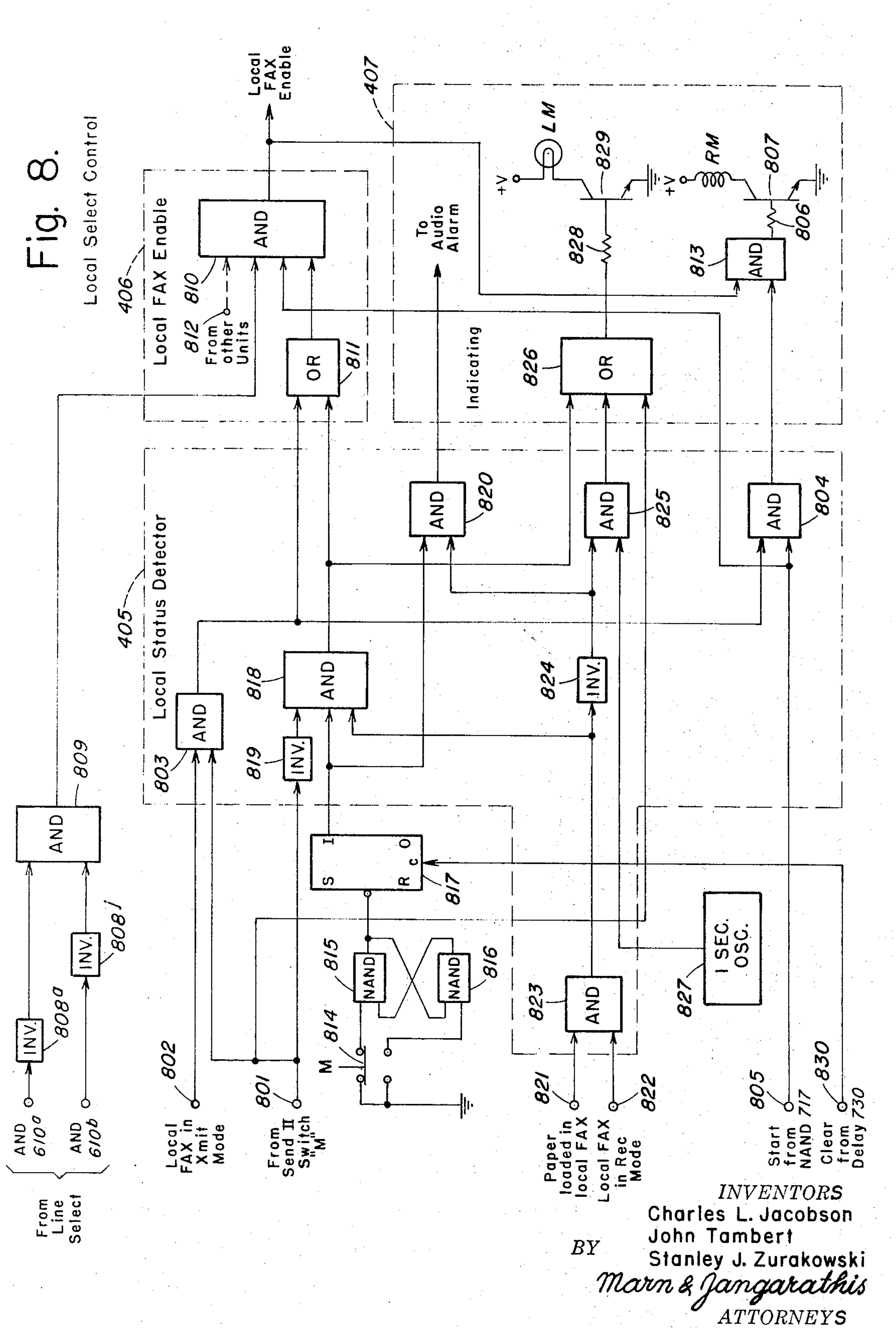
FIG. 8 is a logic circuit representing the remaining blocks illustrated in FIG. 4.

It will be seen from the forthcoming description of FIG. 8 that the enabling signal transmitted to the local facsimile transceiver for the purpose of initiating a facsimile transmission differs from the enabling signal produced at the output terminal of coincidence means 712. Accordingly, when the local facsimile transceiver is selected to transmit, i.e., when movable contacts 618 and 715 of switch means SEND II and III, respectively, are positioned at stationary contact position "M," energizing potential corresponding to a binary "1" is supplied from the source of energizing potential +V, through movable contact 618, to stationary contact position "M," to inverting means 714. Hence, a binary "0" is applied by inverting means 714 to coincidence means 712 thereby inhibiting the production of an enabling signal at the output terminal thereof. Since the stationary contact position "M" of switch means SEND III is not connected to further means, it is appreciated that the inhibiting function performed by inverting means 714 may be omitted.

It has been described that a binary "1" is provided at the output terminal of NAND gate 717 in response to a manual operation that commences a facsimile transmission. Accordingly, manually operable switch means 716 is provided having a pair of contacts adapted to supply a reference potential corresponding to a binary "0" to an input terminal of NAND gate 717. Switch means 716 may be similar to aforedescribed switch means 601*a* . . . 601*j* and therefore further description need not be provided herein. NAND gate 717 is interconnected with NAND gate 718 to form a flip-flop circuit similar to that formed by the interconnection of NAND gates 602*a* and 603*a*. An input terminal of NAND gate 718 is selectively coupled to a reference potential by manually operable switch means 722. The switch means 722 is similar to switch means 716. The input terminal of NAND gate 718 is further coupled to delay means 730 for a purpose soon to be described. The output terminals of NAND gates 717 and 718 are coupled by current limiting resistance means 719 and 723, respectively, to the control or base electrodes of transistor means 720 and 724, respectively. Transistor means 720 is connected in series relationship with Start lamp 721 and reference or ground potential. Similarly, transistor means 724 is connected in series relationship with Clear lamp 725 and reference or ground potential. Each of Start lamp 721 and Clear lamp 725, respectively, are connected to a source of energizing potential +V. Transistor means 720 and 724 are adapted to be activated whereby operating current flows through Start lamp 721 and Clear lamp 725, respectively. The transistor means 720 and 724 thus serve to perform a switching function and may be replaced by other conventional switching means.

The manual operation of switch means 716, such as by depressing a push-button switch or by closing a single pole, single throw switch or the like, couples an input terminal of NAND gate 717 to the reference potential, thereby supplying a binary "0" to said input terminal. Accordingly, a binary "1" is provided at the output terminal of NAND gate 717 which, in turn, is supplied to an input terminal of NAND gate 718. If switch means 722 is not manually operated, and if delay means 730 is not activated, a second input terminal of NAND gate 718 is provided with a binary "1." Accordingly, the output terminal of NAND gate 718 is supplied with a binary "0." The binary "1" produced by NAND gate 717 is applied to coincidence means 712 as aforedescribed and, in addition, is applied to terminal 805 illustrated in FIG. 8. Furthermore, the binary "1" is applied to the control or base electrode of transistor means 720, thereby activating the transistor means into its conducting state. Current is therefore permitted to flow from the source of energizing potential +V, through Start lamp 721, across the collector-emitter junction of transistor means 720, to the reference potential. The flow of current through Start lamp 721 energizes the lamp to produce a constant illumination indicating that a facsimile transmission has been initiated by an operator.

At the conclusion of a facsimile transmission, or at any time when it is necessary to do so, switch means 722 is manually operated to supply an input terminal of NAND gate 718 with reference potential corresponding to a binary "0." Consequently, a binary "1" is produced at the output terminal of NAND gate 718 and applied to an input terminal of NAND gate 717. If switch means 716 is assumed to comprise a spring loaded push-button switch, the switch means 716 will be restored to its initial state illustrated in FIG. 7 subsequent to the manual operation thereof. Accordingly, NAND gate 717 is provided with a binary "1" at each input terminal thereof and, therefore, a binary "0" is provided at its output terminal. The binary "1" produced at the output terminal of NAND gate 718 is applied to the control or base electrode of transistor means 724 to activate the transistor means to its conducting state. Consequently, current flows from the source of energizing potential +V, through Clear lamp 725, across the collector-emitter junction of transistor means 724, to reference potential. Thus it is seen that the manual operation of switch means 722 results in the constant illumination of Clear lamp 725 and the extinguishing of Start lamp 721, thereby indicating that the illustrated apparatus has been restored to an initial quiescent condition. It should now be recognized that switch means 716 and 722 correspond to aforedescribed START switch 23 and CLEAR switch 26, respectively; and Start lamp 721 and Clear lamp 725 correspond to the aforementioned lamps associated with START switch 23 and CLEAR switch 26. The binary "0" produced upon the manual operation of switch means 722 corresponds to the aforedescribed "Clear" signal which is applied to terminal 617 of FIG. 6 to reset each of the flip-flop means 604*a* . . . 604*j* to its initial quiescent state and, in addition, is applied to terminal 830 of FIG. 8. The binary "0," or "Clear" signal, may alternatively be produced by delay means 730 as will now be described.

End of message detecting means 403 is comprised of a flip-flop circuit including NAND gates 727 and 728, coincidence means 729, delay means 730, coincidence means 731, audible tone generating means 733 and End of Message lamp 736. NAND gates 727 and 728 are interconnected in a manner similar to the interconnection of NAND gates 717 and 718. An input terminal of NAND gate 727 is connectable to a reference potential by manually operable switch means 726. Switch means 726 corresponds to previously described EOM reset switch 24 illustrated in FIG. 1. Accordingly, switch means 726 may be a conventional spring loaded push-button switch, a single pole, single throw switch, or the like. An input terminal of NAND gate 728 is connected to inverting means 709. The output terminal of NAND gate 728 is connected to a first input terminal of coincidence means 729, the latter means including a second input terminal connected to inverting means 709. Coincidence means 729 is similar to aforedescribed coincidence means and therefore, may comprise an AND gate. Further description of the coincidence means is not here provided.

The output terminal of inverting means 709 is connected to an input terminal of delay means 730. Delay means 730 may comprise a conventional timing delay circuit adapted to respond to an input signal to produce an output signal at a predetermined time subsequent to the application of the input signal thereto. Accordingly, delay means 730 may comprise a conventional Schmitt trigger circuit or the like wherein a binary "0" is produced at the output terminal thereof at a predetermined time subsequent to the application of a binary "1" to the input terminal thereof. It is recognized that, if desired, delay means 730 may comprise other conventional circuit means capable of performing in the aforementioned manner. As illustrated, the output terminal of delay means 730 is connected in common relationship to an input terminal of NAND gate 718, and to terminals 617 and 830.

Coincidence means 731 includes a first input terminal coupled to the output terminal of coincidence means 729 and a second input terminal coupled to aforedescribed oscillating means 713. An output terminal of coincidence means 731 is coupled to audible tone generating means 733 via adjustable amplifying means 732. Audible tone generating means 733 may comprise a conventional audible tone generator similar to that described with reference to FIG. 6. The volume of the audible tone produced by the audible tone generating means 733 is dependent upon the amplitude of the signal supplied thereby amplifying means 732. The gain of amplifying means 732 is adjustable to thereby regulate the volume of the audible tone produced by audible tone generating means 733.

Coincidence means 729 is further coupled through current limiting resistance means 734 to the control or base electrode of transistor means 735. Transistor means 735 may comprise a conventional switching transistor or other switching device connected in series relationship with End of Message lamp 736 and reference potential. End of Message lamp 736 may be similar to the aforedescribed lamp associated with EOM reset switch 24 and is adapted to provide a constant illumination upon the detection of the completion of a facsimile transmission. Accordingly, End of Message lamp 736 is connected to a source of reference potential +V.

In the operation of end of message detecting means 403, the initial quiescent condition thereof is defined by a binary "1" provided at the output terminal of NAND gate 727. When a facsimile transmission is commenced, the binary "1" produced by detecting means 705 is inverted and is applied as a binary "0" to an input terminal of NAND gate 728 by inverting means 709. Accordingly, a binary "1" is now produced at the output terminal of NAND gate 728 and a binary "0" is produced at the output terminal of NAND gate 727. Since a binary "0" is produced by inverting means 709, coincidence means 729 is not provided with a binary "1" at each input terminal thereof. Accordingly, a binary "0" is produced at the output terminal of coincidence means 729. However, when a facsimile transmission is completed, a binary "0" is produced by detecting means 705 which, in turn, is inverted by inverting means 709 and a binary " 1" is applied to coincidence means 729. It is recognized that a binary "1" supplied to the input terminal of NAND gate 728 has no effect upon the output signal thereof since NAND gate 727 supplies a binary "0" thereto. Coincidence means 729 is now supplied with a binary "1" at each input terminal thereof and therefore supplies coincidence means 731 with a binary "1." The binary "1" supplied to coincidence means 731 is combined with the relatively low frequency pulse signal produced by oscillating means 713 to produce a corresponding slowly varying pulse signal at the output terminal of coincidence means 731. The slowly varying pulse signal is amplified in accordance with the selected gain of amplifying means 732 and results in a pulsating audible tone generated by audible tone generating means 733. The binary "1" produced by coincidence means 729 is additionally applied to the control or base electrode of transistor means 735 to activate the transistor means to its conducting state. Accordingly, current is permitted to flow from the source of energizing potential +V, through End of Message lamp 736, across the collector-emitter junction of transistor means 735, to reference potential. It is seen, therefore, that the activating of transistor means 735 is equivalent to the closing of a switch whereby End of Message lamp 736 is provided with a constant illumination. Accordingly, an operator is apprised of the completion of a facsimile transmission by the illumination of End of Message lamp 736 and by the pulsating audible tone generated by audible tone generating means 733.

At a predetermined time following the application of a binary "1" to delay means 730 by inverting means 709, a "Clear" signal corresponding to a binary "0" is produced by delay means 730. The "Clear" signal, which if desired, may comprise a binary "1," is supplied to terminals 617 and 830 and, in addition, results in the energizing of Clear lamp 725.

At this time a subsequent facsimile transmission may be initiated in the now understood manner. If, after the completion of a first facsimile transmission, a second facsimile transmission occurs prior to the generation of the "Clear" signal by delay means 730, detecting means 705 supplies inverting means 709 with a binary "1" and inverting means 709 applies a binary "0" to coincidence means 729 and to delay means 730. Accordingly, delay means 730 is deactivated and the "Clear" signal will not be produced until after the completion of the subsequent facsimile transmission.

It is noted that the binary "0" produced by coincidence means 729 during the second facsimile transmission serves to de-energize audible tone generating means 733 and extinguish End of Message lamp 736. It is recognized however, that at the completion of the second facsimile transmission, audible tone generating means 733 and End of Message lamp 736 are again energized. An operator who is now apprised of the completion of a facsimile transmission may extinguish the audible tone generating means 733 and End of Message lamp 736 by operating switch means 726. The manual operation of switch means 726 applies reference potential corresponding to a binary "0" to an input terminal of NAND gate 727 thereby producing a binary "1" at the output terminal of said NAND gate. Accordingly, NAND gate 728 applies a binary "0" to coincidence means 729 thereby extinguishing audible tone generating means 733 and End of Message lamp 736. Alternatively, the input terminal of NAND gate 727 may additionally be coupled to suitable circuitry included in the local facsimile transceiver such that a binary "0" is applied thereto when the facsimile "paper" door is manually opened.

To summarize the operation of the apparatus illustrated in FIG. 7, the positioning of movable contact 715 at a desired one of the stationary contact positions establishes a communication channel from coincidence means 712 through coincidence means 738, through movable contact 715 of switch means SEND III, through the stationary contact, to the telephone line and thence to the remote facsimile transceiver selected to transmit. Manual operation of switch means 716 provides a binary "1" at the output terminal of NAND gate 717 whereby coincidence means 712 is enabled to transmit the enabling signal generated by dividing means 711 and oscillating means 713 to the movable contact 715. The enabling signal is not transmitted if one of coincidence means 619*a* . . . 619*j* detects the selection of a remote facsimile transceiver to simultaneously transmit and receive. Upon receipt of the enabling signal, the remote facsimile transceiver commences a facsimile transmission which is detected by data detecting means 401 such that a binary "1" is produced at the output terminal of detecting means 705. Coincidence means 712 is thus inhibited from the further transmission of the enabling signal and NAND gate 728 applies a binary "1" to one input terminal of coincidence means 729. When the facsimile transmission is completed, detecting means 705 applies a binary "0" to inverting means 709 which in turn supplies a second input terminal of coincidence means 729 with a binary "1." Accordingly, audible tone generating means 733 and End of Message lamp 736 are energized to provide their respective indications of the completion of a facsimile transmission. The "Clear" signal is automatically produced by delay means 730 at a predetermined time subsequent to the completion of the facsimile transmission. Alternatively, the "Clear" signal may be produced by the manual operation of switch means 722. Accordingly, the illustrated apparatus then admits of its initial quiescent condition and is prepared for a subsequent facsimile transmission. The indications provided by audible tone generating means 733 and End of Message lamp 736 may be extinguished by the operation of switch means 726. It is noted that delay means 730 may be inhibited from producing the "Clear" signal if switch means 737 is manually operated. This applies a binary "0" to the delay means, inhibiting a response thereby to the binary "1" produced by inverting means 709. This feature is turned to account when plural transmission between predetermined facsimile transceivers are desired.

That portion of the block diagram illustrated in FIG. 4 that is utilized to control the operation of the local facsimile transceiver is illustrated in FIG. 8. Local status detecting means 405 is comprised of coincidence means 803, coincidence means 818, coincidence means 820, coincidence means 825 and coincidence means 804. Each of the coincidence means may be similar to aforedescribed coincidence means 606*a* and therefore may comprise an AND gate. It is well understood that, if desired, each of the coincidence means may comprise conventional NAND gates. Coincidence means 803 includes first and second input terminals coupled to terminals 801 and 802 respectively. Terminal 801 is coupled to stationary contact position "M" of switch means SEND II illustrated in FIG. 6. Terminal 802 is coupled to the local facsimile transceiver and is adapted to receive a binary "1" when the local facsimile transceiver admits of its transmit mode of operation. This may be facilitated by the operation of conventional switching devices provided in the local facsimile transceiver. The output terminal of coincidence means 803 is coupled to local facsimile enable means 406 and in addition to an input terminal of coincidence means 804. A second input terminal of coincidence means 804 is coupled to terminal 805 which is adapted to receive the binary "1" produced when switch means 716 is manually operated to commence a facsimile transmission. The output terminal of coincidence means 804 is coupled to indicating means 407.

Coincidence means 818 is similar to aforedescribed coincidence means 606*a* and performs an analogous function. Accordingly, a first input terminal of coincidence means 818 is coupled to an output terminal of flip-flop means 817 and is adapted to be provided with a select signal. A second input terminal of coincidence means 818 is coupled to the output terminal of coincidence means 823, the latter means including first and second input terminals coupled to terminals 821 and 822 respectively. Coincidence means 823 is adapted to supply coincidence means 818 with a status signal representing the capability of the local facsimile transceiver to receive facsimile information. Accordingly, terminals 821 and 822 may be coupled to the local facsimile transceiver whereby appropriate signals are applied thereto. In the embodiment described herein, terminal 821 is capable of receiving a binary "1" when the local facsimile transceiver is provided with paper upon which received facsimile information is recorded. In addition, terminal 822 is adapted to receive a binary "1" when the local facsimile transceiver admits of its receive mode of operation. Hence, the signals applied to terminals 802 and 822 may be derived from a common switch means provided in the local facsimile transceiver. A third input terminal of coincidence means 818 is coupled to terminal 801 via inverting means 819. Inverting means 819 is similar to aforedescribed inverting means 607*a* and is capable of performing a logic negation function of the signals supplied thereby by terminal 801. The output terminal of coincidence means 818, in addition to being applied to local facsimile enable means 406, is supplied to indicating means 407. The coincidence means 818 serves to provide an output signal when the local facsimile transceiver is properly selected by a manual operation to receive facsimile information.

Coincidence means 820 includes a first input terminal coupled to the output terminal of flip-flop means 817 and a second input terminal coupled to the output terminal of coincidence means 823 by inverting means 824. The coincidence means 820 serves to detect the selection of the local facsimile transceiver to receive facsimile information when said facsimile transceiver is not capable of doing so. Accordingly, the output terminal of coincidence means 820 is coupled to an audio alarm circuit similar to the alarm circuit coupled to coincidence means 610*a*.

Coincidence means 825 includes a first input terminal connected in common relationship with an input terminal of coincidence means 820 to the inverting means 824. A second input terminal of coincidence means 825 is coupled to oscillating means 827 which may be identical to the oscillating means 616 previously described with respect to FIG. 6. Coincidence means 825 is coupled to the indicating means 407 and is adapted to provide a characteristic signal when the local facsimile transceiver is not capable of receiving facsimile information.

The select signal applied to the first input terminal of coincidence means 818 by flip-flop means 817 is produced in substantially the same way as the select signals previously described with respect to FIG. 6. Accordingly, flip-flop means 817 may be similar to aforedescribed flip-flop means 604*a* and includes a trigger input terminal connected to the output terminal of NAND gate 815. NAND gates 815 and 816 are interconnected to form a set/reset flip-flop circuit. NAND gates 815 and 816 include input terminals coupled to respective contacts of switch means 814. Switch means 814 is a manually operable switch such as a push button switch, a single pole double throw switch, or the like, and corresponds to aforedescribed switch 38. It is apparent that switch means 814 is similar to and operates in an identical manner as aforedescribed switch means 601*a*. It is recognized, therefore, that the manual operation of switch means 814 i.e., depressing and releasing the switch means, produces a negatively poled pulse at the output terminal of NAND gate 815.

Local facsimile enable means 406 is comprised of coincidence means 810, OR circuit 811 and terminal 812. Coincidence means 810 is adapted to produce a local facsimile enabling signal, such as a binary "1," at the output terminal thereof when the local facsimile transceiver has been properly selected to transmit or to receive facsimile information. The output terminal of coincidence means 810 is coupled to the local facsimile transceiver whereby the enabling signal serves to activate the local facsimile transceiver to execute a particular operation in accordance with the signals appearing at terminals 802 and 822. A first input terminal of coincidence means 810 is coupled to OR circuit 811, the latter circuit including first and second input terminals coupled to coincidence means 803 and 818, respectively. A second input terminal of coincidence means 810 is coupled to the output terminal of coincidence means 809. The latter coincidence means is adapted to detect when one of the remote fcsimile transceivers is erroneously selected to receive facsimile information. Accordingly, the input terminals of coincidence means 809 are coupled to the output terminals of coincidence means 610*a* . . . 610*j* via inverting means 808*a* . . . 808*j*, respectively. A third input terminal of coincidence means 810 is coupled to terminal 805 which in turn is connected to the output terminal of NAND gate 717. A fourth input terminal of coincidence means 810 is coupled to terminal 812. The connection between terminal 812 and coincidence means 810 is represented as a broken line to indicate that this connection may be optional in accordance with the particular application of the disclosed invention. If for example, the station selecting means in accordance with the present invention is utilized in a communication system wherein a plurality of similar station selecting means are employed, then a binary "1" will be applied to terminal 812 when each of the other station selecting means admits of a proper manual operation. It is recognized that terminal 812 and the electrical connection between said terminal and coincidence means 810 may be omitted when only a single station selecting means is provided in the communication system. The output terminal of coincidence means 810 is additionally coupled to coincidence means 813, the output terminal of which is connected to the control or base electrode of transistor means 807 via current limiting resistance means 806.

Indicating means 407 is similar to the aforedescribed indicating means 303*a* and includes an OR circuit 826, coincidence means 813 and a lamp LM. OR circuit 826 is similar to aforedescribed OR circuit 613*a* and includes a first input terminal coupled to coincidence means 818, a second input terminal coupled to coincidence means 825 and a third input terminal coupled to terminal 801. The output terminal of OR circuit 826 is coupled to the control or base electrode of transistor means 829 by current limiting resistance means 828. The output terminals of transistor means 829 are connected in series relationship with lamp LM and reference potential. Lamp LM is coupled to a source of energizing potential +V. It will become apparent that transistor means 829 operates in response to a signal supplied thereto by OR circuit 826 and if desired the transistor means may be replaced by other conventional switching devices. Indicating means 407 additionally includes activating means comprised of a relay energizing coil RM connected in series with the output terminals of transistor means 807. The control or base electrode of transistor means 807 is coupled to coincidence means 804 via current limiting resistance means 806 and coincidence means 813. The output terminal of aforementioned coincidence means 813 is coupled to the control or base electrode of transistor means 807. A further input terminal of coincidence means 813 is coupled to the output terminal of coincidence means 804. Relay energizing coil RM is adapted to control the closing of activatable switch means R'M illustrated in FIG. 5 in accordance with the current flowing through the relay energizing coil.

The operation of the apparatus illustrated in FIG. 8 will now be described. If the local facsimile transceiver is not provided with paper upon which facsimile information is recorded, or if the local facsimile transceiver does not admit of its receive mode of operation then a binary "0" will be provided at terminal 821 or terminal 822. Accordingly, coincidence means 823 will supply each of coincidence means 818 and inverting means 824 with a binary "0." Inverting means 824 performs a logic negation on the supplied binary "0" and therefore applies a binary "1" to each of coincidence means 820 and 825. Oscillating means 827 produces alternating binary 1's and 0's each having predetermined duration. Accordingly, coincidence means 825 supplies OR circuit 826 with the alternating binary 1's and 0's. It is appreciated, therefore, that OR circuit 826 supplies the alternating binary 1's and 0's to the control or base electrode of transistor means 829. Accordingly, transistor means 829 is alternately conducting and non-conducting whereby a pulsating current flows from the source of energizing potential +V, through lamp LM, across the collector-emitter junction of transistor means 829, to the reference potential. Consequently, lamp LM exhibits a pulsating illumination indicating that the local facsimile transceiver is not capable of receiving facsimile information.

If, now, an operator erroneously selects the local facsimile transceiver to receive facsimile information the manual operation of switch means 814 results in a pulse signal at the output terminal of NAND gate 815. The intrinsic negative transition included in the pulse signal is effective to activate flip-flop means 817 whereby a binary "1" is applied to coincidence means 818. Since the local facsimile transceiver is not capable of receiving facsimile information, a binary "0" is provided at the output terminal of coincidence means 823 whereby coincidence means 818 is inhibited from gating the binary "1" produced by flip-flop means 817 to OR circuit 811. However, coincidence means 820 is now provided with a binary "1" at each input terminal thereof and a binary "1" corresponding to an audio alarm signal is produced at its output terminal. The audio alarm signal may be applied to a suitable audible tone generating means whereby an operator may be apprised of the erroneous selection of the local facsimile transceiver to receive facsimile information. Th audio alarm signal may be extinguished by a second manual operation of switch means 814 or by the manual operation of switch means 722. If switch means 814 is again operated, a second pulse is produced at the output terminal of NAND gate 815 and flip-flop means 817 is deactivated such that a binary "0" is produced at the output terminal thereof. It is appreciated that if switch means 722 is manually operated, reference potential corresponding to a binary "0" is applied to terminal 830 which, in turn, supplies the binary "0" to the clear input terminal of flip-flop means 817. It is recalled that a binary "0" applied to the clear input terminal of a flip-flop means will reset said flip-flop means to its quiescent or initial state whereby a binary "0" is produced thereby.

When the local facsimile transceiver is provided with apper for the recording of facsimile information and admits of its receive mode of operation, coincidence means 823 produces a binary "1" at the output terminal thereof. Accordingly, inverting means 824 supplies coincidence means 825 with a binary "0," thereby deactivating the coincidence means. It is observed, therefore, that the control or base electrode of transistor means 829 is not provided with alternating binary 1's and 0's and lamp LM is extinguished. If the transmit station selecting means has been manually operated such that one of the remote facsimile transceivers has been selected to transmit then a binary "0" is applied to terminal 801 and inverting means 819 applies a binary "1" to coincidence means 818. The manual operation of switch means 814 results in a select signal corresponding to a binary "1" at the output terminal of flip-flop means 817. Accordingly, coincidence means 818 receives a binary "1" at each input terminal thereof to produce a binary "1" at its output terminal. It is seen, therefore, that coincidence means 818 compares the capability of the local facsimile transceiver to receive to a selectively produced select signal. If the local facsimile transceiver is capable of receiving, the coincidence means 818 applies the select signal as a binary "1" to each of OR circuits 811 and 826. The binary "1" applied to OR circuit 826 is supplied thereby to the control or base electrode of transistor means 829 to activate said transistor means into its conducting state Accordingly, current flows from the source of energizing potential +V through lamp LM, across the collector-emitter junction transistor means 829, to reference potential, resulting in a constant illumination of the lamp LM. In addition, the binary "1" supplied to OR circuit 811 by coincidence means 818 is applied in turn to an input terminal at coincidence means 810. If none of the remote facsimile transceivers has been improperly selected to receive facsimile information, i.e., if none of the coincidence means 610*a* . . . 610*j* produces a binary "1," then each of inverting means 808*a* . . . 808*j* supplies coincidence means 809 with a binary "1." Accordingly, coincidence means 810 is provided with a binary "1" by coincidence means 809. Furthermore, if each of the other station selecting means included in the communication system are properly operated, a binary "1" is provided at terminal 812. Thus, when switch means 716 is manually operated to commence a facsimile transmission, a binary "1" is provided at terminal 805 and coincidence means 810 is supplied with a binary "1" at each input terminal thereof. Consequently coincidence means 810 applies an enabling signal corresponding to a binary "1" to the local facsimile transceiver to enable the local facsimile transceiver to operate in its receive mode. Hence, the enabling signal is not produced unless the local facsimile transceiver is properly selected to receive. It is recognized that the constant illumination of lamp LM provides an indication of the proper selection of the local facsimile transceiver to receive facsimile information. If desired, coincidence means 810 may include a further input terminal coupled to the output terminal of inverting means 740 of FIG. 7. Accordingly, if one of the remote facsimile transceivers is selected to simultaneously transmit and receive, OR circuit 739 applies a binary "1" to inverting means 740 which, in turn, applies a binary "0" to the further input terminal of coincidence means 810. In this instance, coincidence means 810 will not apply an enabling signal to the local facsimile transceiver.

If the local facsimile tranceiver is capable of receiving, terminal 802 is provided with a binary "0" indicating that the local facsimile transceiver does not admit of its transmit mode of operation. Hence, if the transmit station selecting means is erroneously operated such that movable contact 618 of switch means SEND II is positioned at stationary contact position "M" a binary "1" is applied at terminal 801. Accordingly, the binary "1" is supplied to OR circuit 826 which in turn supplies the binary "1" to the control or base electrode of transistor means 829. Hence, current flows through lamp LM and the lamp exhibits a constant illumination indicating that the local facsimile transceiver has been selected to transmit. Nevertheless, the binary "0" applied to terminal 802 inhibits the energization of coincidence means 803 which, in turn, supplies a binary "0" to OR circuit 811 and to coincidence means 804. In addition, the binary "1" applied to terminal 801 is inverted by inverting means 819 which supplies a binary "0" to coincidence means 818. Hence, the energization of coincidence means 818 is inhibited regardless of the manual operation of switch means 814, and a binary "0" is applied to OR circuit 811. In response to the binary "0" applied at each input terminal thereof, OR circuit 811 supplies a binary "0" to coincidence means 810 thereby inhibiting the energization of the latter coincidence means. Consequently, an enabling signal is not supplied to the local facsimile transceiver. Thus, it is seen that coincidence means 818 prevents the erroneous manual selection of the local facsimile transceiver to simultaneously transmit and receive facsimile information.

Should the local facsimile transceiver admit of its transmit mode of operation, a binary "1" is applied to terminal 802 and a binary "0" is applied to terminal 822. It is observed therefore that coincidence means 823 applies a binary "0" to inverting means 824 which in turn supplies coincidence means 825 with a binary "1." the alternating binary 1's and 0's produced by oscillating means 827 are thus supplied through coincidence means 825 to OR circuit 826 which in turn periodically activate transistor means 829 into it conducting state. Accordingly, lamp LM exhibits a flashing illumination indicating that the local facsimile transceiver is not capable of receiving. If the transmit station selecting means is now manually operated such that the local facsimile transceiver is selected to transmit, movable contact 618 of switch means SEND II is positioned at stationary contact position "M" and energizing potential corresponding to a binary "1" is supplied from the movable contact 681 to stationary contact position "M," to terminal 801, through OR circuit 826, to the control or base electrode of transistor means 829. The transistor means is thus activated into its conducting state whereby lamp LM exhibits a constant illumination indicating that the local facsimile transceiver has been selected to transmit. Coincidence means 803 is now provided with a binary "1" at each input terminal thereof whereby a binary "1" is transmitted through OR circuit 811 to an input terminal of coincidence means 810. In addition, the binary "1" is supplied to an input terminal of coincidence means 804. If it is assumed that none of the remote facsimile transceivers have been erroneously selected to receive facsimile information, coincidence means 809 supplies coincidence means 810 with a binary "1." A facsimile transmission may now be commenced by the manual operation of switch means 716 which produces a binary "1" at terminal 805. Accordingly, the enabling signal is generated by coincidence means 810 and coincidence means 804 applies a binary "1" to the control or base electrode of transistor means 807 through coincidence means 813. Consequently, transistor means 807 is activated into its conducting state and current flows through relay energizing coil RM. The activation of the relay energizing coil RM closes activatable switch means R'M of FIG. 5 and a communication channel is established between the local facsimile transceiver through limiter means 512, to stationary contact position "M" of switch means SEND I, through movable contact 511, through amplitude equalizing means 501, through filter means 502, through phase equalizing means 503, through amplifying means 504 to those facsimile transceivers that have been selected to receive in accordance with the selective closing of activatable switch means R'1–R'10. Facsimile transmission is initiated in response to the enabling signal supplied to the local facsimile transceiver by coincidence means 810.

If one of the remote facsimile transceivers has been erroneously selected to receive facsimile information it is recalled that a corresponding one of the coincidence means 610*a* . . . 610*j* will produce a binary "1." Accordingly, a corresponding one of inverting means 808*a* . . . 808*j* will supply coincidence means 809 with a binary "0," thereby inhibiting the energization of the latter coincidence means. Accordingly, coincidence means 810 will not generate the enabling signal and instead will provide a binary "0" at its output terminal. A binary "0" will likewise be provided if one of the coincidence means 619*a* . . . 619*j* produces a binary "1." Accordingly, coincidence means 813 is provided with a binary "0" at one input terminal thereof and the binary "1" produced by coincidence means 804 is not transmitted to the control or base electrode of transistor means 807. Thus, transistor means 807 is not activated into its conducting state and current does not flow through the relay energizing coil RM. Hence, the relay energizing coil is not activated and activatable switch means R'M is not closed. It is therefore seen that the local facsimile transceiver is not coupled to the stationary contact position "M" of switch means SEND I and a facsimile transmission is not initiated. Nevertheless, lamp LM exhibits a constant illumination in view of the selecting of the local facsimile transceiver to transmit. Upon rectifying the error in selecting a remote facsimile transceiver to receive facsimile information, coincidence means 809 again produces a binary "1" and coincidence means 810 generates the enabling signal. The binary "1" produced by coincidence means 804 is now transmitted through coincidence means 813. A facsimile transmission is thus initiated and relay energizing coil RM is activated to close activatable switch means R'M.

Although the present invention has been described in detail with respect to a facsimile transmission system, it should be readily apparent to one of ordinary skill in the art that the disclosed apparatus admits of ready application to any data communication system, such as the communication of digital data, telemetric data or the like, wherein one device is to transmit to one or more further devices. Moreover, the foregoing has described a data communication system wherein a station selecting means is disposed at the same location as the local data device. It is readily apparent however that the station selecting means may be disposed at any convenient location and may be operable with or without a local data device. In the event that the instant invention is employed solely with remote data devices, the apparatus illustrated in FIG. 8 may be omitted. In addition, any convenient number of remote stations may be controlled in accordance with the present invention. Although FIG. 1 represents that the instant invention exhibits the capacity to control ten remote stations, it is clear that the precise number to be controlled is not intended as any limitation on the scope of the instant invention. Furthermore, a plurality of station selecting means, disposed at various locations, may be utilized in a single system to enable a corresonding plurality of local devices to communicate with the same remote devices. As has been described hereinabove, the instant invention includes various manually operable switch means together with visual indicating means. The precise nature of each of the manually operable switch means and visual indicating means forms no part per se of the present invention. Hence, the type of switches and lamps used in accordance with the present invention is merely one of design. Similarly, the low frequency of oscillating means 616, 713 and 827 as well as the predetermined time delay exhibited by delay means 730 is dependent merely upon the intended application of the instant invention. It should be recognized that the logic circuits illustrated in FIGS. 6, 7 and 8 may be operable on positive or negative d.c. voltages representing binary signals and the circuit components may be comprised of conventional AND gates or OR circuits or NAND gates and NOR circuits or any combination thereof. Likewise, the illustrated transistor means may be NPN transistors, PNP transistors, FET transistors or the like. Alternatively, various other conventional switching devices may be used to perform the switching operations executed by the illustrated transistor means. Thus, the manner in which each of the visual indicating means is energized and the manner in which each of the relay energizing coils are activated are dependent upon the nature of the transistor means or switching devices coupled thereto.

While the invention has been particularly shown and described with reference to a specific embodiment thereof, it will be obvious to those skilled in the art that the foregoing and various other changes and modifications in form an details may be made without departing from the spirit and scope of the invention. It is therefore intended that the appended claims be interpreted as including all such changes and modifications.

What is claimed is:

1. Apparatus for establishing communication between a data transmitting device and one or more data receiving devices, comprising:

transmit selecting means for selecting one of a plurality of predetermined data transmitting devices to transmit data;

receive selecting means for selecting one or more of a plurality of predetermined data receiving devices to receive said data;

data transmit means interconnected between said transmit and receive selecting means for providing a transmission path between said selected data transmitting device and each of said selected data receiving devices;

data receive means for receiving the data transmitted by said selected data transmitting device and for supplying said data transmit means with the transmitted data; and control means coupled to said transmit and receive selecting means for regulating said transmit and receive selecting means so as to assure the proper selection of a data transmitting device capable of transmitting data and the proper selection of data receiving devices capable of receiving data, said control means being adapted to indicate an erroneous selection.

2. The apparatus of claim 1 wherein said control means comprises:

status detecting means for determining which of said plurality of predetermined data receiving devices are capable of receiving data and for enabling the selection by said receive selecting means of one or more of those data receiving devices that are capable of receiving data; and enable signal means for generating an enabling signal that is transmitted to said selected one of said plurality of predetermined data transmitting devices to enable said selected data transmitting device to transmit data.

3. The apparatus of claim 2 wherein said status detecting means includes inhibit means for inhibiting the transmission of data to a data receiving device that is not capable of receiving data and means for indicating the selection by said receive selecting means of such data receiving device.

4. The apparatus of claim 3 wherein said control means further comprises:

data detecting means for detecting the transmission of data by one of said predetermined data transmitting devices;

means coupled to said data detecting means for preventing the transmission of said enabling signal during said transmission of data; and end of transmission detecting means for detecting the termination of said transmission of data and for establishing a quiescent condition for said control means, thereby permitting a subsequent selection of one or more data receiving devices by said receive selecting means.

5. The apparatus of claim 4 further including a plurality of visual indicating means associated with said plurality of predetermined data receiving devices and coupled to said status detecting means for providing first indications when data receiving devices are not capable of receiving data, second indications when data receiving devices are capable of receiving data and third indications when the selection of data receiving devices by said receive selecting means is enabled.

6. The apparatus of claim 5 wherein said transmit selecting means comprises selective switching means for establishing an electrical connection between said data receive means and said data transmit means and for establishing an electrical connection between said enable signal means and said selected data transmitting device; said selective switching means supplying an energizing signal to said visual indicating means for providing a fourth indication when a data transmitting device is selected.

7. The apparatus of claim 6 wherein said receive selecting means comprises:

activatable switch means connected between each of said plurality of predetermined data receiving devices and said data transmit means;

activating means coupled to said activatable switch means and responsive to said status detecting means for activating said activatable switch means, said activating means being inhibited by said inhibit means; and energizable means for selectively producing energizing signals for said activating means.

8. The apparatus of claim 7 wherein said data receive means includes a plurality of status signal receiving means corresponding in number to said plurality of predetermined data receiving devices for receiving status signals from said data receiving devices representing that said data receiving devices are capable of receiving data.

9. The apparatus of claim 8 wherein said status detecting means comprises a plurality of gating means corresponding in number to said plurality of predetermined data receiving devices, each of said gating means being coupled to an energizable means and a status signal receiving means for applying a selectively produced energizing signal to an activating means when a status signal is received, said gating means being inhibited from applying said selectively produced energizing signal to said activating means when said status signal is not received.

10. The apparatus of claim 9 wherein said data transmit means comprises transmit wave shaping means coupled to each of said activatable switch means for shaping the data signals to be received by said data receiving devices such that said data signals are compatible with the communications medium extending between said transmit wave shaping means and said data receiving devices, and for simultaneously applying each shaped data signal to each of said activatable switch means.

11. The apparatus of claim 10 wherein said data receive means further includes a plurality of receive wave shaping means correspnding in number to said data transmitting devices, each of said receive wave shaping means being coupled to said selective switching means for shaping the data signals received from said data transmitting device such that said shaped data signals are compatible with said transmit wave shaping means.

12. In a facsimile communication system including a plurality of remote facsimile transceivers capable of transmitting and receiving facsimile information and a local facsimile transceiver capable of transmitting and receiving facsimile information, apparatus for establishing communication channels therebetween, comprising:

transmit selecting means for selecting said local facsimile transceiver or one of said remote facsimile transceivers to transmit facsimile information;

receive selecting means for selecting one or more of said local and remote facsimile transceivers to receive said facsimile information;

transmit means interconnected between said transmit and receive selecting means for providing a transmission path between a facsimile transceiver selected to transmit and each of said facsimile transceivers selected to receive;

receive means for receiving the facsimile information transmitted by said facsimile transceiver selected to transmit and for supplying said transmit means with said facsimile information; and control means coupled to aid local facsimile transceiver and said transmit and receive selecting means for monitoring the operating conditions of said local and remote facsimile transceivers and for regulating said transmit and receive selecting means in accordance with the monitored conditions.

13. The apparatus of claim 12 wherein said control means includes:

status detecting means for determining which of said local and remote facsimile transceivers admit of data receiving modes adapted to receive facsimile information and for enabling the selection by said receive selecting means of one or more of those facsimile transceivers admitting of a data receiving mode; and enable signal means for generating an enabling signal that is transmitted to the local or remote facsimile transceiver selected by said transmit selecting means to enable said selected facsimile transceiver to transmit facsimile information.

14. The apparatus of claim 13 wherein said status detecting means includes means for inhibiting the simultaneous selection of a given facsimile transceiver to transmit and receive facsimile information.

15. The apparatus of claim 14 wherein said control means further includes means for indicating when a local or remote facsimile transceiver not admitting of said data receiving mode is selected to receive facsimile information.

16. The apparatus of claim 15 including a visual indicating means associated with each of said local and remote facsimile transceivers and coupled to said status detecting means for providing a first indication when said associated facsimile transceiver does not admit of said data receiving mode, a second indication when said associated facsimile transceiver admits of said data receiving mode and a third indication when said status detecting means enables the selection by said receive selecting means of said associated facsimile transceiver or when said associated facsimile transceiver is selected by said transmit selecting means.

17. The apparatus of claim 16 wherein said receive selecting means comprises:

a plurality of first manually operable switch means, each of said first manually operable switch means being associated with a corresponding one of said local and remote facsimile transceivers for producing a first select signal upon the manual operation thereof;

a plurality of activatable switch means, each of said activatable switch means being associated with a corresponding one of said remote facsimile transceivers for establishing a connection between said associated facsimile transceiver and said transmit means; and a plurality of activating means, each of said activating means being associated with a corresponding one of said activatable switch means and selectively responsive to a first select signal for activating said activatable switch means.

18. The apparatus of claim 17 wherein said receive means includes a plurality of status signal receiving means, each of said status signal receiving means being associated with a corresponding one of said remote facsimile transceivers for receiving a status signal from said associated remote facsimile transceiver representing that said associated remote facsimile transceiver admits of said data receiving mode.

19. The apparatus of claim 18 wherein said status detecting means includes a plurality of gating means, each of said gating means being associated with a corresponding one of said remote facsimile transceivers and coupled to a status signal receiving means and a first manually operable switch means for supplying a first select signal to an activating means when a status signal is received from said associated remote facsimile transceiver.

20. The apparatus of claim 19 wherein said status detecting means further includes additional gating means coupled to said first manually operable switch means associated with said local facsimile transceiver and responsive to signals generated by said local facsimile transceiver representing that said local facsimile transceiver admits of said receive mode for supplying a first select signal to local facsimile transceiver enable means whereby said local facsimile transceiver is enabled to receive facsimile information.

21. The apparatus of claim 20 wherein said transmit selecting means comprises a plurality of second manually operable switch means, each of said second manually operable switch means being associated with a corresponding one of said local and remote facsimile transceivers for producing a second select signal upon the manual operation thereof and for establishing an electrical connection between said receive means and said transmit means, each of said second manually operable switch means further establishing an electrical connection between said enable means and an associated facsimile transceiver upon said manual operation.

22. The apparatus of claim 21 wherein said enable signal means comprises:

enable signal generating means for generating said enabling signal;

enable signal gating means coupled to said enable signal generating means for gating said enabling signal to each of said second manually operable switch means associated with a remote facsimile transceiver when facsimile information is not transmitted by said transmit means; and local facsimile gating means coupled to said second manually operable switch means associated with said local facsimile transceiver and to said local facsimile transceiver and responsive to signals generated by said local facsimile transceiver representing that said local facsimile transceiver admits of a transmit mode for supplying a second select signal to said local facsimile transceiver enable means whereby said local facsimile transceiver is enabled to transmit facsimile information.

23. The apparatus of claim 22 further including means for coupling each of said second manually operable switch means to a corresponding one of said visual indicating means for supplying a corresponding visual indicating means with a second select signal in accordance with said manual operation of said second manually operable switch means.

24. The apparatus of claim 23 wherein said means for inhibiting the simultaneous selection of a given facsimile transceiver to transmit and receive facsimile information comprises means for supplying a corresponding one of said plurality of gating means and said additional gating means included in said status detecting means with the second select signal produced by the manual operation of a second manually operable switch means to inhibit the operation of said corresponding gating and additional gating means.

25. The apparatus of claim 24 wherein said control means further includes:

facsimile information detecting means coupled to said transmit means for detecting the transmission of facsimile information by a transmitting facsimile transceiver; and inhibit means coupled to said enable signal gating means and responsive to a detected transmission of facsimile information for inhibiting said enable signal gating means from gating said enable signal to a second manually operable switch means.

26. The apparatus of claim 25 wherein said facsimile information detecting means includes:

end of message means for detecting the termination of facsimile information transmission; and reset means responsive to the termination of facsimile information transmission for resetting each of said operated first manually operable switch means to a quiescent condition at a predetermined time subsequent to the termination of facsimile information transmission.

27. The apparatus of claim 26 wherein each remote facsimile transceiver is coupled to said receive means and to an activatable switch means by telephone lines.

28. A method of establishing communication between a plurality of data transceivers, comprising the steps of:

selecting one of said data transceivers to transmit data information;

determining which of said data transceivers admits of a data receiving mode capable of receiving data information;

selecting one or more of said data transceivers to receive data information;

indicating the selection of a data transceiver not capable of receiving data information;

supplying the data transceiver selected to transmit data information with an enabling signal to commence data information transmission; and relaying the data information transmitted from said data transceiver selected to transmit to those data transceivers selected to receive and capable of receiving data information.

29. The method of claim 28 wherein said step of determining which of said data transceivers admits of a data receiving mode comprises the steps of:

selectively receiving status signals from said data transceivers representing that said data transceivers admit of said data receiving mode;

detecting each of said received status signals; and indicating the detection of each of said received status signals.

30. The method of claim 29 wherein said step of selecting one or more of said data transceivers to receive data information comprises the steps of:

generating energizing signals for each data transceiver selected to receive data information;

combining each energizing signal with an associated one of said received status signals to produce activating signals; and establishing transmission paths to said data transceivers selected to receive in response to said activating signals.

31. The method of claim 30 wherein said step of indicating the selection of a data transceiver not capable of receiving data information comprises the steps of:

providing a first indication when an energizing signal is generated in the absence of a detected status signal associated with the data transceiver selected to receive data information; and providing a second indication when a single data transceiver is simultaneously selected to transmit and receive data information.

32. The method of claim 31 wherein said step of selecting one of said data transceivers to transmit data information comprises the steps of:

establishing a data receiving path from said data transceiver selected to transmit to enable the receipt of data information therefrom;

inhibiting the production of an activating signal associated with said data transceiver selected to transmit if said data transceiver selected to transmit is also selected to receive; and providing an indication of the selection of said data transceiver to transmit.

33. The method of claim 32 wherein said step of relaying data information comprises the steps of:

receiving data information from said data transceiver selected to transmit via said established data receiving path;

modifying said received data information in accordance with the transmission characteristics of said transmission path; and transmitting said modified data information to said data transceivers selected to receive via said established transmission paths.

* * * * *